(12) United States Patent
Higashitaniguchi et al.

(10) Patent No.: US 7,751,313 B2
(45) Date of Patent: Jul. 6, 2010

(54) DATA TRANSMISSION METHOD AND APPARATUS

(75) Inventors: Atsuko Higashitaniguchi, Fukuoka (JP); Hiroshi Kinoshita, Fukuoka (JP); Kunihiko Hamamoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 321 days.

(21) Appl. No.: 11/840,355

(22) Filed: Aug. 17, 2007

(65) Prior Publication Data
US 2008/0049611 A1 Feb. 28, 2008

(30) Foreign Application Priority Data
Aug. 24, 2006 (JP) .............................. 2006-228166

(51) Int. Cl.
*G01R 31/08* (2006.01)
(52) U.S. Cl. ...................................... 370/228; 370/230
(58) Field of Classification Search ......... 370/225–228, 370/229–240
See application file for complete search history.

(56) References Cited
U.S. PATENT DOCUMENTS
6,856,594 B1 * 2/2005 Aihara et al. ............... 370/228

2006/0002370 A1 * 1/2006 Rabie et al. ................. 370/351

FOREIGN PATENT DOCUMENTS
JP 9-018492 1/1997

* cited by examiner

*Primary Examiner*—Kwang B Yao
*Assistant Examiner*—Tung Q Tran
(74) *Attorney, Agent, or Firm*—Katten Muchin Rosenman LLP

(57) ABSTRACT

In a data transmission method and apparatus which can perform a switchover of all of the main lines without requiring much construction cost, a transmission apparatus sets, upon frame transmission or reception, combinations of a plurality of main lines with virtual paths established so as to include at least a part of a bandwidth of the main lines in one or more protection lines as redundant configurations. Upon frame transmission, the apparatus copies frames received in the main lines, assigns identifiers of the redundant configurations to the copied frames, and transmits the copied frames to the virtual paths of the redundant configurations. Upon frame reception, the apparatus determines whether the main lines or the virtual paths forming the redundant configurations are valid, deletes the identifiers of the redundant configurations assigned to frames received from the protection lines, and determines whether the frames from which the identifiers have been deleted should be respectively discarded or transferred depending on validity or invalidity of the main lines.

6 Claims, 35 Drawing Sheets

FIG.13A

| REDUNDANT CONFIGURATION NO. | MAIN LINE PORT | PROTECTION LINE PORT | VLAN ID |
|---|---|---|---|
| 1 | S1 | S4 | 1 |
| 2 | S2 | S4 | 2 |
| 3 | S3 | S4 | 3 |

FIG.13B

| REDUNDANT CONFIGURATION NO. | MAIN LINE PORT | PROTECTION LINE PORT | VLAN ID |
|---|---|---|---|
| 1 | R1 | R4 | 1 |
| 2 | R2 | R4 | 2 |
| 3 | R3 | R4 | 3 |

FIG.14A

| FRAME PROCESSING | REDUNDANT CONFIGURATION NO. |
|---|---|
| TRANSFER | - |

FIG.14B

| FRAME PROCESSING | REDUNDANT CONFIGURATION NO. |
|---|---|
| TRANSFER | 1 |

FIG.14C

| FRAME PROCESSING | REDUNDANT CONFIGURATION NO. |
|---|---|
| TRANSFER | 2 |

FIG.14D

| FRAME PROCESSING | REDUNDANT CONFIGURATION NO. |
|---|---|
| TRANSFER | 3 |

FIG.14E

| FRAME PROCESSING | REDUNDANT CONFIGURATION NO. |
|---|---|
| Tag DELETION | - |

FIG.25A

| REDUNDANT CONFIGURATION NO. | PROTECTION LINE PORT | SHAPING RATE |
|---|---|---|
| 1 | S11 | 1Gbps |

FIG.25B

| REDUNDANT CONFIGURATION NO. | PROTECTION LINE PORT | SHAPING RATE |
|---|---|---|
| 1 | S11 | 1Gbps |
| 2 | S11 | 1Gbps |
| 3 | S11 | 1Gbps |
| 4 | S11 | 1Gbps |
| 5 | S11 | 1Gbps |
| 6 | S11 | 1Gbps |
| 7 | S11 | 1Gbps |
| 8 | S11 | 1Gbps |
| 9 | S11 | 1Gbps |
| 10 | S12 | 1Gbps |

FIG.25C

| REDUNDANT CONFIGURATION NO. | PROTECTION LINE PORT | SHAPING RATE |
|---|---|---|
| 1 | S11 | 500Mbps |
| 2 | S11 | 1Gbps |
| 3 | S11 | 1Gbps |
| 4 | S11 | 1Gbps |
| 5 | S11 | 1Gbps |
| 6 | S11 | 1Gbps |
| 7 | S11 | 1Gbps |
| 8 | S11 | 1Gbps |
| 9 | S11 | 1Gbps |
| 10 | S12 | 1Gbps |

DATA TRANSMISSION METHOD AND APPARATUS

BACKGROUND OF THE INVENTION

1. Field of the Invention

The present invention relates to a data transmission method and apparatus, and in particular to a protection method and apparatus for a data transmission to a communication carrier which provides wide-area LAN services or the like.

2. Description of the Related Art

In wide-area LAN services, corporate LANs are mainly connected, so that a main signal security or guarantee by a duplex mechanism is important. For attaining the main signal guarantee, a main signal redundant configuration such as an N:1 protection system or 1:1 protection system is adopted, so that communications are performed with a protection line even if a fault has occurred in a main line, thereby protecting the main signal and securing reliability of a data transmission. It is to be noted that in the following description, each of the main line and the protection line denotes a physical line.

1. N:1 Protection System: FIG. 28

In the above-mentioned N:1 protection system, a redundant configuration is formed with a single protection line for N sets of main lines. In the example of N=3 shown in FIG. 28, main lines L1-L3 are connected to main line ports W1-W3 of transmission apparatuses 200_1 and 200_2, and a protection line L4 is connected to protection line ports P1, thereby totally forming a transmission line L.

2. 1:1 Protection System: FIGS. 29-34

On the other hand, in the 1:1 protection system, a redundant configuration is formed with a single protection line for a single main line. In the example shown in FIG. 29, the main lines L1-L3 are respectively connected to the main line ports W1-W3, and protection lines L4-L6 are respectively connected to protection line ports P1-P3.

It is to be noted that in either system, the main line and the protection line are composed of lines with the same bandwidth.

Hereinafter, the 1:1 protection system will be described in more detail by referring to FIGS. 30-34.

2. 1. Arrangement: FIG. 30

FIG. 30 shows an arrangement of the transmission apparatuses 200_1 and 200_2 (hereinafter, occasionally represented by a reference numeral 200) in FIG. 29. The functions of the portions are as follows.

Reception Port Selector 1:

The reception port selector 1 manages the information of a port which is presently valid within the main line/protection line ports (W1-W3 and P1-P3) of the redundant configuration, and transfers only a frame received at the valid port to a policing portion 2. Accordingly, when a fault has occurred in the main line, a protection line which forms the redundant configuration with the main line is set as a valid port.

Policing Portion 2:

The policing portion 2 performs policing, and transfers the frame to a switching portion 3.

Switching Portion 3:

The switching portion 3 determines a transmission port based on a destination MAC address of the frame, and transfers the frame to a shaper portion 5_1 and a redundant frame transmitter 40.

Redundant Frame Transmitter 40:

The redundant frame transmitter 40 copies the frame, and transmits the copied frames from the main line port and the protection line port respectively through the shaper portions 5_2 and 5_3.

Shaper Portion 5 (5_1 and 5_3):

The shaper portion 5 performs shaping and transmits the frame.

Command Accepting Portion 6:

The command accepting portion 6 notifies, according to an input command, the information thereof to a redundant configuration manager 70 and the shaper portion 5.

Redundant Configuration Manager 70:

The redundant configuration manager 70 manages redundant configuration settings (setting contents) by the command input information with a redundant configuration management table TBL1, and notifies the redundant configuration settings to the reception port selector 1 and the redundant frame transmitter 40.

It is to be noted that although a reception port and a transmission port without a redundant configuration are connected to the policing portion 2 and the shaper portion 5_1, they are not specifically related to the protection system of the present invention, so that the description of such ports will be omitted in the following description.

2. 2. Operation Example: FIGS. 31-34

Hereinafter, the operation of the portions will be described referring to FIGS. 31-34.

1) Frame Transmission from Protection Line Port: FIGS. 31 and 32

Firstly, the operation up to forming redundant configurations 1-3 by the transmission apparatus 200_1 will be described referring to FIG. 31.

The command accepting portion 6 which has received a command for forming the redundant configuration 1 with a transmission port S1 to the main line L1 being made the main line port W1 and a transmission port S4 to the protection line L4 being made the protection line port P1 notifies settings to the redundant configuration manager 70. The redundant configuration manager 70 notifies to the redundant frame transmitter 40 a redundant configuration No.1, the main line port S1, and the protection line port S4 for the transmission port.

It is to be noted that while the redundant configuration manager 70 performs transmission port processing and reception port processing, only the transmission port processing will now be described for simplifying the description, where the reception port processing will be described in the following 2).

Similarly, the command accepting portion 6 receives commands for forming the redundant configuration 2 with a transmission port S2 being made the main line port W2 and the transmission port S4 being made the protection line port P2, and the redundant configuration 3 with a transmission port S3 being made the main line port W3 and the transmission port S4 being made the protection line port P3. The operation in this case is the same as the case of forming the redundant configuration 1.

The case of transmitting a frame received at a reception port R1 of the transmission apparatus 200_1 shown in FIG. 31 from the main line port W1 (transmission port S1) and the protection line port P1 (transmission port S4) as the redundant configuration 1 will now be described.

The frame received at the reception port R1 is transferred to the policing portion 2. The policing portion 2 performs policing the frame to be transferred to the switching portion 3. The switching portion 3 determines the transmission port S1 (redundant configuration 1) based on the destination MAC address of the frame, and transfers the frame to the redundant frame transmitter 40.

The redundant frame transmitter 40 copies the frame, and transfers the copied frames respectively to the shaper portion 5_2 of the main line port W1 (transmission port S1) and the shaper portion 5_3 of the protection line port P1 (transmission port S4: protection line L4). Then, the shaper portions 5_2 and 5_3 perform shaping the frames to be transmitted.

In the case of the transmission ports determined by the switching portion 3 being ports of the redundant configurations 2 and 3, the copied frames are transmitted from the protection line ports P2 (transmission port S5: protection line L5) and P3 (transmission port S6: protection line L6) respectively as in the case of the redundant configuration 1. FIG. 32 shows a frame transmission state at this time from all of the redundant configurations of the transmission apparatus 200_1.

2) Frame Reception at Protection Line Port: FIG. 33

Hereinafter, the operation up to forming the redundant configurations 1-3 by the transmission apparatus 200_2 shown in FIG. 33 will be described.

The command accepting portion 6 having received a command for forming the redundant configuration 1 with the reception port R1 being made the main line port W1 and the reception port R4 being made the protection line port P1 notifies settings to the redundant configuration manager 70. The redundant configuration manager 70 notifies to the reception port selector 1 the redundant configuration No. 1, the main line port R1, and the protection line port R4, as to the reception port. While the redundant configuration manager 70 performs both of the transmission port processing and the reception port processing, only the reception port processing will now be described since the transmission port processing has been already described in the above-mentioned 1).

Similarly, the redundant configuration 2 is formed with the reception port R2 as the main line port W2 and with the reception port R5 as the protection line port P2, and the redundant configuration 3 is formed with the reception port R3 being made the main line port W3 and the reception port R6 being made the protection line port P3. The operation in this case is the same as the case of forming the redundant configuration 1.

Hereinafter, an operation up to transmitting (transferring) the frame received at the main line port W1 (reception port R1) and the protection line port P1 (reception port R4) of the redundant configuration 1 of the transmission apparatus 200_2 shown in FIG. 33 from the transmission port S1 will be described.

As for the frame received at the main line port W1 (reception port R1), the reception port R1 is notified to the reception port selector 1 of the redundant configuration 1, and then the frame is transferred. Since the reception port notified is the reception port R1 without a fault occurrence, the reception port selector 1 determines that the port is a current valid port of the redundant configuration 1, and transfers the frame to the policing portion 2. The policing portion 2 performs policing the frame to be transferred to the switching portion 3. The switching portion 3 determines the transmission port S1 based on the destination MAC address, and transfers the frame to the shaper portion 5_2 of the transmission port S1. The shaper portion 5_2 performs shaping the frame to be transmitted from the transmission port S1.

On the other hand, as for the frame received at the protection line port P1 (reception port R4), the reception port R4 is notified to the reception port selector 1 of the redundant configuration 1, and then the frame is transferred. Since having recognized that the valid reception port of the redundant configuration 1 is the reception port R1, the reception port selector 1 determines that the notified port is not the current valid port of the redundant configuration 1 since the notified reception port is the port R4, so that the frame is discarded.

3) Frame Reception Upon Fine fault: FIG. 34

Hereinafter, an operation up to transmitting the frame received at the protection line port P1 (reception port R4) from the transmission port 1 when a fault has occurred in the main line port W1 (reception port R1) of the redundant configuration 1 of the transmission apparatus 200_2 shown in FIG. 34 will be described.

The frame received at the protection line port P1 (reception port R4) is transferred to the reception port selector 1 of the redundant configuration 1. Having recognized that the valid reception port of the redundant configuration 1 is this time the reception port R4 due to the line fault occurrence, the reception port selector 1 determines that the notified reception port 4 is the current valid port of the redundant configuration 1, and transfers the frame to the policing portion 2. The policing portion 2 performs policing the frame to be transferred to the switching portion 3. The switching portion 3 determines the transmission port S1 based on the destination MAC address of the frame, and transfers the frame to the shaper portion 5_2 of the transmission port S1. The shaper portion 5_2 performs shaping the frame to be transmitted from the transmission port.

Also in the cases of the protection line port P2 (reception port R5) of the redundant configuration 2 and the protection line port P3 (reception port R6) of the redundant configuration 3, the reception port R5 or R6 is notified to the reception port selector 1 of the redundant configuration by the same operation as the case of the redundant configuration 1, for transferring the frame. Since the notified port is the port R5 or R6, the reception port selector 1 determines that neither port is the current valid port of the redundant configurations 2 or 3, and discards the frame. FIG. 34 shows a frame reception state at this time.

It is to be noted that there are an ATM communication network and a fault restoration method by which a fault restoration message cell is transmitted from an incoming exchange and information is exchanged in an autonomous and distributed manner upon fault of the exchange, a network state is notified to a transmitting exchange, routes are switched over, and a route fault due to the fault of the exchange is restored by a VC route level (see e.g. patent document 1). [Patent document 1] Japanese Patent Application Laid-open No. 9-18492

There have been problems in the prior art technologies as follows:

In lines forming the redundant configuration by the N:1 protection system, when a fault occurs in the main line W2 in a state where the protection line P1 is used due to the fault of the main line W1 as shown in FIG. 35, the main signal of the main line W2 can not be guaranteed since the protection line P1 has been already used.

On the other hand, in lines forming the redundant configuration by the 1:1 protection system, when a fault occurs in the main line, the main line is always guaranteed by the protection line since the main line and the protection line exist in a 1:1 correspondence manner. However, while 10 main lines+a single protection line=11 lines are required for the N:1 protection system when a redundant configuration of e.g. 10 lines is desired to be formed, 10 main lines+10 protection lines=20 lines are required for the 1:1 protection system.

Thus, in the case of the N:1 protection system, it is impossible to switch all of the main lines. On the other hand, in the case of the 1:1 protection system which can switch all of the main lines, the protection lines for the number of protections are required, which leads to a problem that construction cost is increased.

SUMMARY OF THE INVENTION

It is accordingly an object of the present invention to provide a data transmission method and apparatus which can perform a switchover of all of the main lines without requiring much construction cost.

In order to achieve the above-mentioned object, a data transmission method (apparatus) according to the present invention comprises: a first step of (means) setting, as redundant configurations, combinations of a plurality of main lines with virtual paths established so as to include at least a part of a bandwidth of the main lines in one or more protection lines; and a second step of (means) copying frames received in the main lines and assigning identifiers of the redundant configurations to the copied frames to be transmitted through the virtual paths combined with the main lines in the redundant configurations.

Also, a data transmission method (apparatus) according to the present invention comprises: a first step of (means) setting, as redundant configurations, combinations of a plurality of main lines with virtual paths established so as to include at least a part of a bandwidth of the main lines in one or more protection lines; a second step of (means) determining whether the main lines or the virtual paths forming the redundant configurations are valid; a third step of (means) deleting identifiers of the redundant configurations assigned to frames received from the protection lines; and a fourth step of (means) determining whether the frames from which the identifiers have been deleted should be respectively discarded or transferred depending on validity or invalidity of the main lines.

The above-mentioned second step (means) may include a step of (means) rendering the main lines valid when no fault has occurred in the main lines, and rendering the virtual paths forming the redundant configurations with the main lines valid when a fault has occurred in the main lines.

Furthermore, the above-mentioned second step (means) may include a third step of (means) accepting redundant configuration setting including shaping rates in order that a total value of the shaping rates of main lines in redundant configurations using a same protection line does not exceed a bandwidth of the same protection line, and a fourth step of (means) performing shaping per redundant configuration according to the shaping rates accepted.

Furthermore, the above-mentioned third step (means) may include a step of (means) performing the redundant configuration setting for another protection line when the total value exceeds the bandwidth of the same protection line.

The above-mentioned identifiers comprise e.g. VLAN-IDs in VLAN Tags provided in the frames.

The above-mentioned concept will now be described referring to FIG. 1. The present invention adopts a protection system which secures main signals of main lines L1-L3 with a single protection line L4 between transmission apparatuses 100_1 and 100_2 (hereinafter, occasionally represented by a reference numeral 100). In the protection line L4, e.g. virtual paths V1-V3 of bandwidths corresponding to the all of the main lines L1-L3 are set, where it is only necessary to provide at least a single protection line, while in the presence of a plurality of protection lines, it is not necessary to set up all of the virtual paths corresponding to all of the main lines in a single protection line, so that insufficient virtual paths may be set up in other protection lines.

The combinations of e.g. the main lines L1-L3 with the virtual paths V1-V3 respectively are made redundant configurations, to which identifiers (IDs) are assigned. By assigning the identifiers to the frames transmitted from protection ports P1-P3, a plurality of virtual 1:1 protection transmission functions (i) can be obtained.

Also, the identifiers assigned in the frames received at the protection line ports P1-P3 are deleted, and the redundant configurations are determined based on the identifiers, so that a plurality of virtual 1:1 protection reception functions (ii) can be obtained.

The data transmission method and apparatus according to the present invention will now be more briefly described by referring to FIGS. 2-7. It is to be noted that in the following description, the protection line port, the transmission port of the protection line (reception port of the protection line), and the virtual path are associated with each other in a 1:1 correspondence manner.

[1] Frame Transmission Operation by Redundant Configuration Setting: FIGS. 2 and 3

1) Firstly, an operation up to forming the redundant configurations 1-3 by the transmission apparatus 100_1 shown in FIG. 2 will be described.

To form the redundant configuration 1 of the main line L1 and the virtual path V1 is set by a command input or the like with the transmission port S1 being made the main line port W1 (main line L1) and the transmission port S4 being made the protection line port P1 (virtual path V1). Based on the settings, transmission port processing and reception port processing are executed.

Similarly, the redundant configuration 2 of the main line L2 and the virtual path V2 with the transmission port S2 being made the main line port W2 and the transmission port S4 as the protection line port P2, and the redundant configuration 3 of the main line L3 and the virtual path V3 with the transmission port S3 being made the main line port W3 and the transmission port S4 being made the protection line port P3 are formed as in the case of redundant configuration 1.

2) Hereinafter, a case where a frame received at the reception port R1 of the transmission apparatus 100_1 shown in FIG. 2 is transmitted from the main line port W1 (transmission port S1) and the protection line port P1 (transmission port S4) of the redundant configuration 1 through the virtual path V1 will be described.

As for the frame received at the reception port R1, the transmission port S1 is determined based on a destination MAC address of the frame. When the frame is transmitted from the main line port W1 (transmission port S1) to the main line L1, the frame is copied, to which an identifier "a" of the redundant configuration 1 is assigned. The frame to which the identifier "a" is assigned is transmitted from the protection line port P1 (transmission port S4) through the virtual path V1 of the protection line L4. FIG. 2 shows the frame transmission state at this moment.

Also in the cases of the transmission port of the redundant configurations 2 and 3, as in the case of the redundant configuration 1, frames to which identifiers "b" (redundant configuration 2) and "c" (redundant configuration 3) are assigned are respectively transmitted from the protection line ports P2 and P3 (transmission port S4) through the virtual paths V2 and V3. FIG. 3 shows the frame transmission state at this moment.

Thus, the identifier is assigned in the frame transmitted from the protection line, thereby enabling the frames of a plurality of redundant configurations to be transmitted with a single protection line.

[2] Frame Reception Operation by Redundant Configuration Setting: FIGS. 4 and 5

1) Firstly, an operation up to forming the redundant configurations 1-3 by the transmission apparatus 100_2 shown in FIG. 4 will now be described.

To form the redundant configuration 1 of the main line L1 and the virtual path V1 is set by a command input or the like with the reception port R1 being made the main line port W1 and the reception port R4 being made the protection line port P1. Based on the settings, the transmission port processing and the reception port processing are performed.

Similarly, the redundant configuration 2 of the main line L2 and the virtual path V2 with the reception port R2 being made the main line port W2 and the reception port R4 being made the protection line port P2, and the redundant configuration 3 of the main line L3 and the virtual path V3 with the reception port R3 being made the main line port W3 and the reception port R4 being made the protection line port P3 are formed as in the case of redundant configuration 1.

2) Hereinafter, an operation up to transmitting from the transmission port S1 the frames received at the main line port W1 (reception port R1) and the protection line port P1 (reception port R4) of the redundant configuration 1 of the transmission apparatus 100_2 shown in FIG. 4 in the absence of a line fault will be described.

As for the frame received at the main line port W1 (reception port R1), the identifier assigned thereto indicates the redundant configuration 1, so that the reception port is R1. Therefore, determining that the reception port R1 is a current valid port of the redundant configuration 1, the transmission apparatus 100_2 determines the transmission port S1 based on the destination MAC address of the frame, so that the frame is transmitted from the transmission port S1.

On the other hand, as for the frame received at the protection line port P1 (reception port R4), the transmission apparatus 100_2 acquires a redundant configuration No.1 based on the identifier "a" assigned in the frame and deletes the identifier "a".

Since the port notified at this moment is R4, it is determined that the reception port R4 is not a current valid port of the redundant configuration 1, so that the frame is discarded. FIG. 4 shows this frame reception state.

Thus, even if the identifier is assigned in the frame received at the protection line port in the absence of the line fault, the frame is normally discarded.

3) Hereinafter, an operation up to transmitting the frame received at the protection port P1 (reception port R4) from the transmission port S1 during a fault occurrence in the main line port W1 (reception port R1) of the redundant configuration 1 of the transmission apparatus 100_2 as shown in FIG. 5 will be described.

While the operation up to deleting the identifier of the frame received at the protection line port P1 (reception port R4) is the same as the operation already described in the above-mentioned 2), the main line port W1 forming the redundant configuration 1 with the protection line port P1 is in a fault state. Therefore, it is determined that the current valid port in the redundant configuration 1 is the protection line port P1 to determine the transmission port S1 based on the destination MAC address of the received frame, so that the frame is transmitted from the transmission port S1.

Thus, even if the identifier is assigned to the frame received at the protection line port, it is normally determined as a valid frame, so that reception processing is performed.

Also, in the cases of the protection line port P2 of the redundant configuration 2 and the protection line port P3 of the redundant configuration 3 (reception port R4 in both cases), redundant configuration Nos.2 and 3 are acquired respectively based on the identifiers "b" and "c" while the identifiers are deleted, as in the case of the redundant configuration 1.

At this time, since the main line ports W2 and W3 forming the redundant configurations 2 and 3 respectively with the protection line ports P2 and P3 are normal without a fault occurrence, it is determined that the protection line ports P2 and P3 are not current valid ports of the redundant configurations 2 and 3, so that the frames are discarded. FIG. 5 shows the frame reception state at this moment.

Thus, the redundant configuration No. is acquired based on the identifier assigned in the frame and the identifier is deleted, thereby enabling the frames of a plurality of redundant configurations to be received with a single protection line.

[3] QoS Guarantee in the Protection Line by the Redundant Configuration Setting

In the present invention, redundant configuration setting and shaping rate setting are accepted so that a total value of the shaping rates of the protection lines forming the redundant configuration with the main lines may not exceed a bandwidth of the protection lines, thereby providing a QoS guarantee in the protection line equivalent to that of the main line.

It is to be noted that since the operation other than the shaping rate setting is the same as the above-mentioned operation, the description thereof will be omitted hereinafter.

1) Firstly, an operation of the transmission apparatus 100_1 up to forming the redundant configuration in the transmission line L between the transmission apparatuses 100_1 and 100_2 shown in FIG. 6 will now be described.

When the redundant configuration 1 is formed, to form the redundant configuration 1 with the transmission port S1 being made the main line port W1 and the transmission port S4 being made the protection line port P1 is set by a command input or the like.

Since there is not shown any other redundant configuration using the same protection line port S4 in this example, a shaping rate A of the redundant configuration 1 is compared with a bandwidth X of the protection line port S4 (protection line port L4).

At this time, it is required to consider the above-mentioned identifier assigned to the frame upon transmitting the frame from the protection line port in order to provide the QoS guarantee in the protection line port equivalent to that of the main line port.

Namely, when the frame of the shaping rate A is transmitted from the main line port W1 and an increase coefficient of the bandwidth having the identifier assigned thereto is α, a bandwidth of A*α is required for transmitting the frame to which the identifier is assigned from the protection line port P1. Accordingly, when the shaping rate is compared with the bandwidth of the protection line, it is required to determine whether or not the rate is the one which can be guaranteed by comparing "shaping rate*bandwidth increase coefficient=A*α" with "bandwidth of protection line=X".

In the example of FIG. 6, the result of "A*α<X" is obtained, which can guarantee QoS. Therefore, the redundant configuration No.1, the protection line port S4, and the shaping rate A are registered.

When the redundant configuration 2 is formed, to form the redundant configuration 2 with the transmission port S2 being made the main line port W2 and the transmission port S4 being made the protection line port P2 is set by a command input or the like. The total value of the shaping rate A of the redundant configuration 1 using the same protection line port S4 and a shaping rate B of the redundant configuration 2 is compared with the bandwidth X of the protection line port S4 now to determine whether or not the rate can be guaranteed.

In the example of FIG. 6, the result of "shaping rate*bandwidth increase coefficient=(A+B)*α"<"bandwidth of protection line port=X" is obtained, which can guarantee the QoS. Therefore, the redundant configuration No.2, the protection line port S4, and the shaping rate B are registered.

When the redundant configuration 3 is formed, to form the redundant configuration 3 with the transmission port S3 being made the main line port W3 and the transmission port S4 being made the protection line port P3 is set by a command input or the like. The total value of the shaping rates (A+B) of the redundant configurations 1 and 2 using the same protection line port S4 and a shaping rate C of the redundant configuration 3 is further compared with the bandwidth X of the protection line port S4 now to determine whether or not the rate can be guaranteed. In the example of FIG. 6, the result of "shaping rate* bandwidth increase coefficient=(A+B+C)*α">"bandwidth of protection line port=X" is obtained, so that the QoS can not be guaranteed, which leads to an error occurrence.

Thus, when the total value of the shaping rates of the redundant configurations which set the same transmission port as the protection line port exceeds the bandwidth of the protection line port, the redundant configuration can not be formed.

2) Hereinafter, an operation of the transmission apparatus 100_1 up to changing the shaping rate of e.g. the redundant configuration 2 will be described as shown in FIG. 7.

When changing the shaping rate of the redundant configuration 2 to D is set by a command input or the like, the transmission apparatus 100_1 compares the total value of the shaping rates except the shaping rate of the redundant configuration 2 (total A; shaping rate of the redundant configuration 1) and the shaping rate D after the change of the redundant configuration 2 with the bandwidth X of the protection line port S4 to determine whether or not the rate can be guaranteed.

In the example of FIG. 7, the result of "shaping rate*bandwidth increase coefficient=(A+D)*α"<"bandwidth of protection line port=X" is obtained, which can guarantee the QoS. Therefore, the shaping rate of the redundant configuration No.2 is updated to D.

Thus, when the total value of the shaping rates of the redundant configurations which set the same transmission port as the protection line port does not exceed the bandwidth of the protection line port even after forming the redundant configuration, the shaping rate can be changed.

Thus, redundant configuration setting and shaping rate setting are accepted so that a total value of the shaping rates of the redundant configurations which set the same transmission port as the protection line port does not exceed a bandwidth of the protection line. Thus, even if the identifier is assigned to the frame and transmitted from the protection line, a QoS guarantee equivalent to the main line in which no identifier is assigned to the frame can be provided.

The present invention can adopt physically N:1 configuration but logically 1:1 configuration. Therefore, it becomes possible to switch all of the main lines. Also, by physically making the protection line a single line, the reduction of the construction cost is made possible.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 13A and 13B are diagrams showing an example of a redundant configuration management table used for a data transmission apparatus according to the present invention;

FIGS. 14A-14E are diagrams showing an example of a received frame processing management table used for a data transmission apparatus according to the present invention;

FIGS. 25A-25C are diagrams showing a shaping rate management table used for an embodiment (2) of the present invention;

DESCRIPTION OF THE EMBODIMENTS

Embodiment (1): FIGS. 8-12, 13A, 13B, 14A-14E, 15-21

Figure 1:
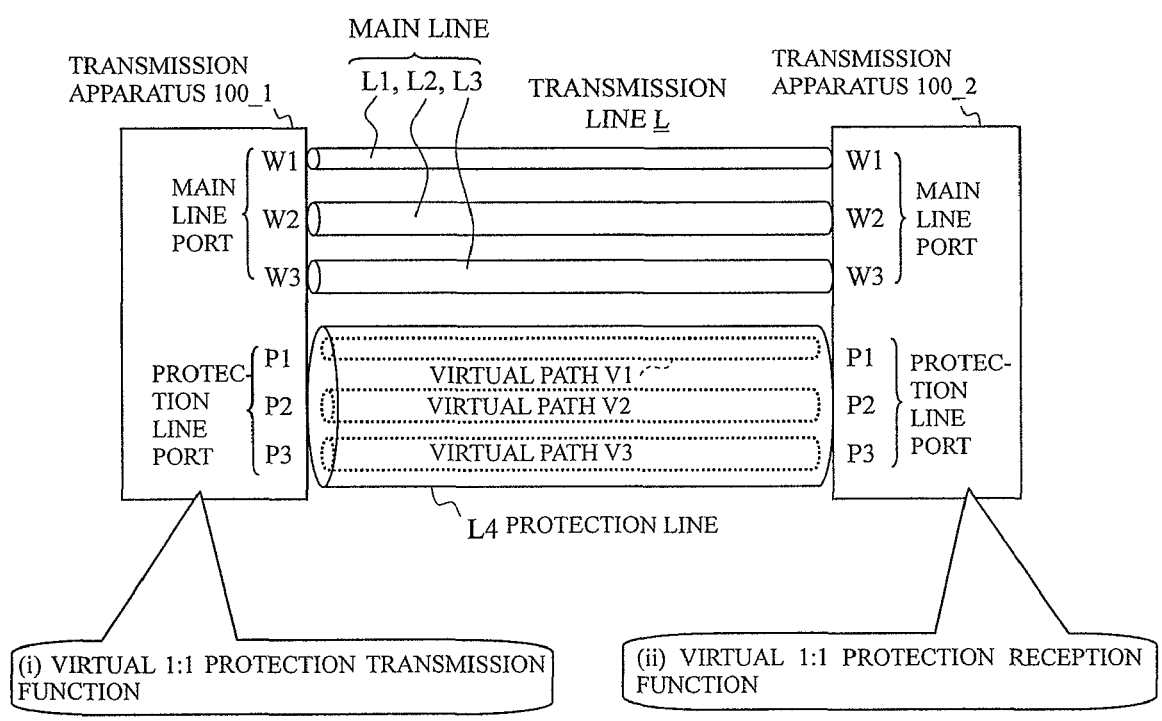
FIG. 1 is a block diagram showing a principle of a data transmission method and apparatus according to the present invention.
Figure 2:
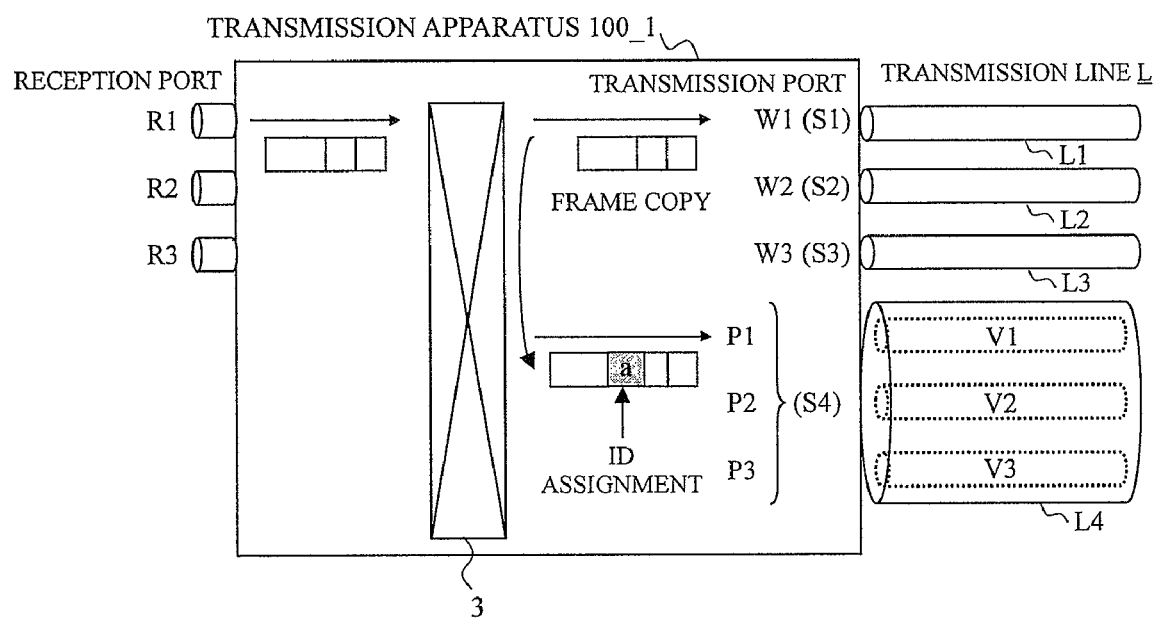
FIG. 2 is a block diagram showing a frame transmission principle (1) of a data transmission method and apparatus according to the present invention.
Figure 3:
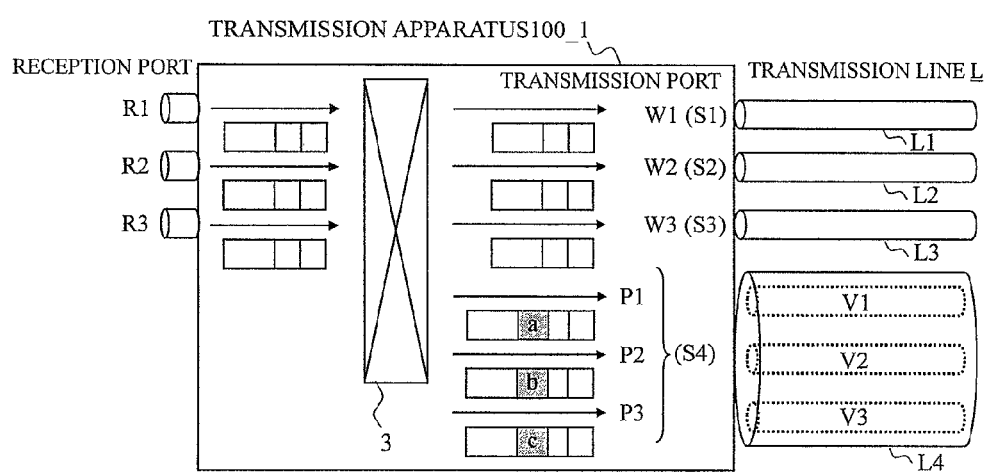
FIG. 3 is a block diagram showing a frame transmission principle (2) of a data transmission method and apparatus according to the present invention.
Figure 4:
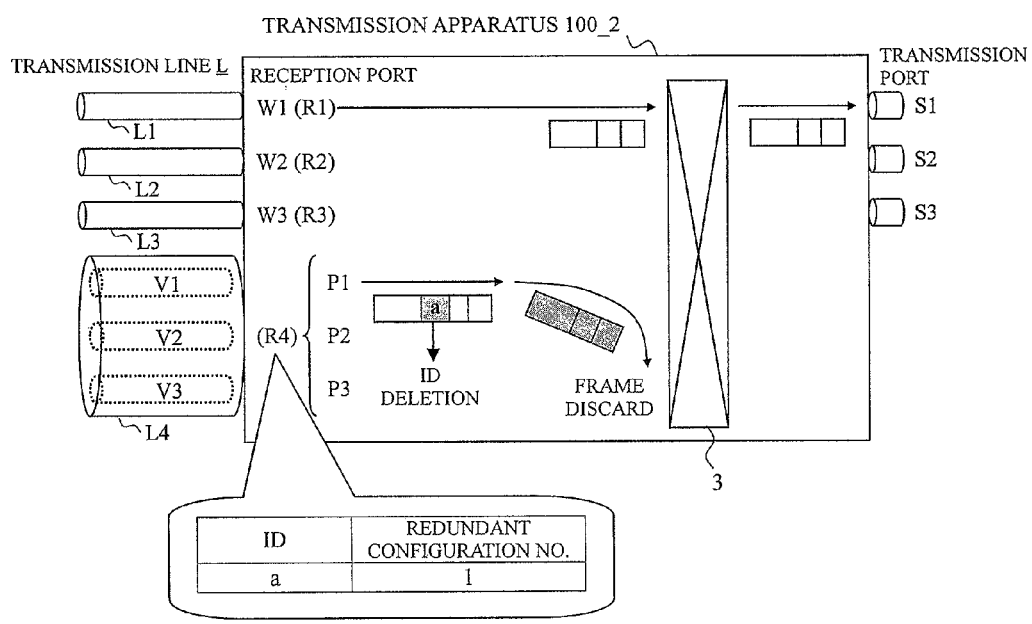
FIG. 4 is a block diagram showing a frame reception principle (1) of a data transmission method and apparatus according to the present invention.
Figure 5:
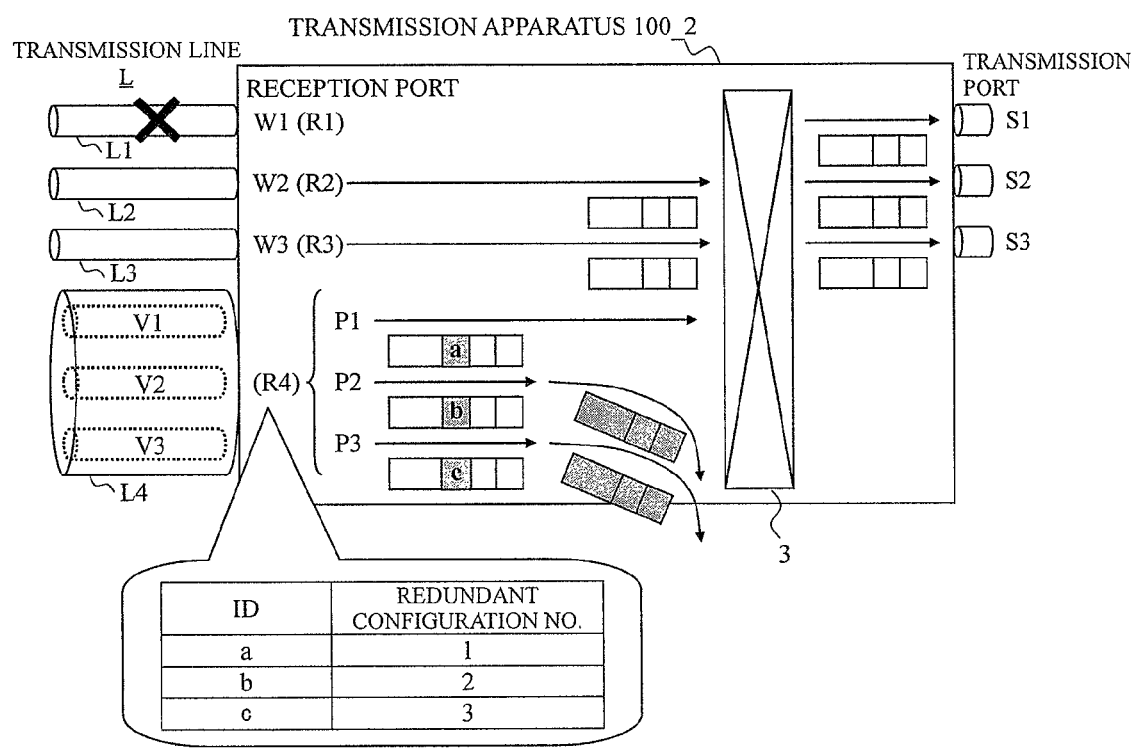
FIG. 5 is a block diagram showing a frame reception principle (2) of a data transmission method and apparatus according to the present invention.
Figure 6:
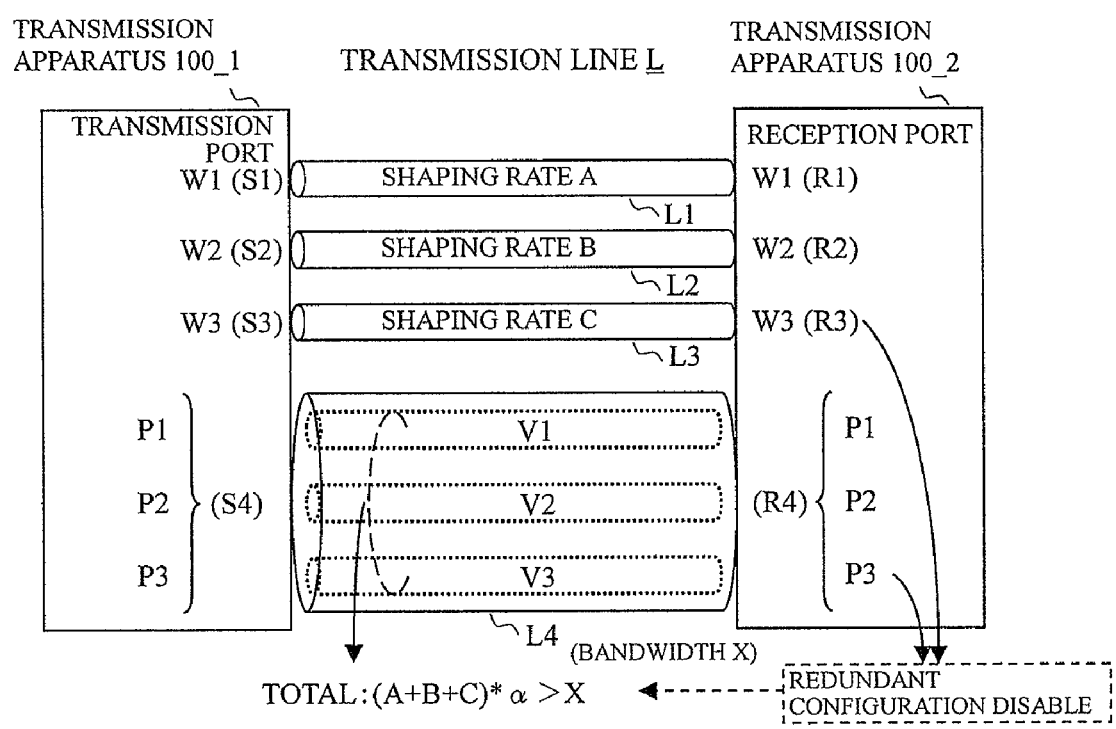
FIG. 6 is a block diagram showing a QoS guarantee principle (1) of a data transmission method and apparatus according to the present invention.
Figure 7:
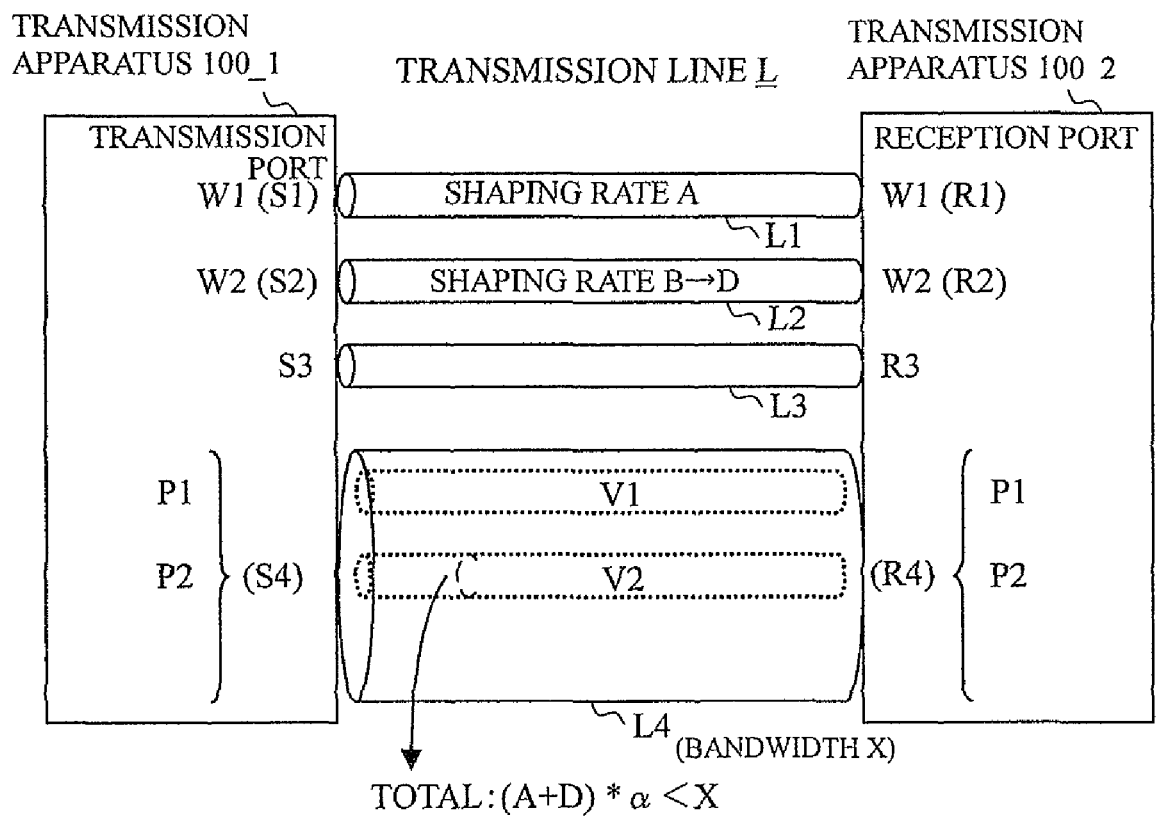
FIG. 7 is a block diagram showing a QoS guarantee principle (2) of a data transmission method and apparatus according to the present invention.
Figure 8:
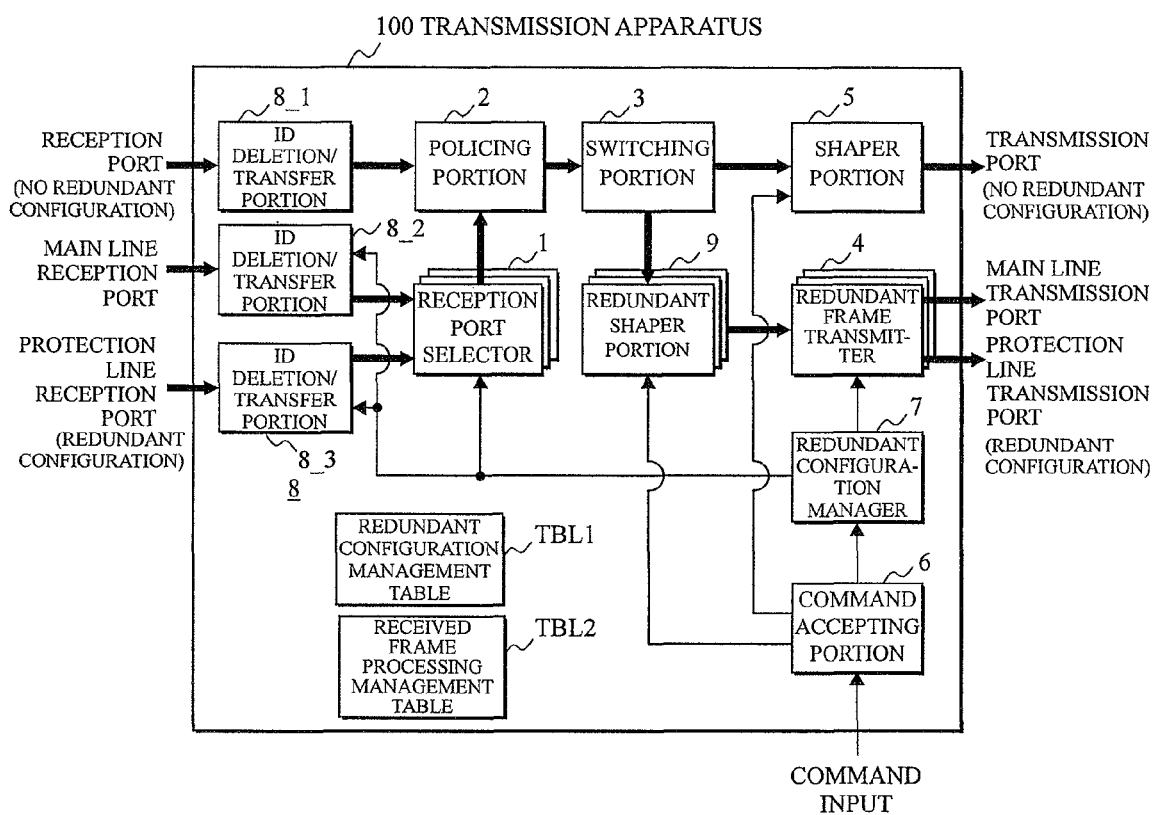
FIG. 8 is a block diagram showing an embodiment (1) of a data transmission apparatus which executes a data transmission method according to the present invention.
Figure 9:
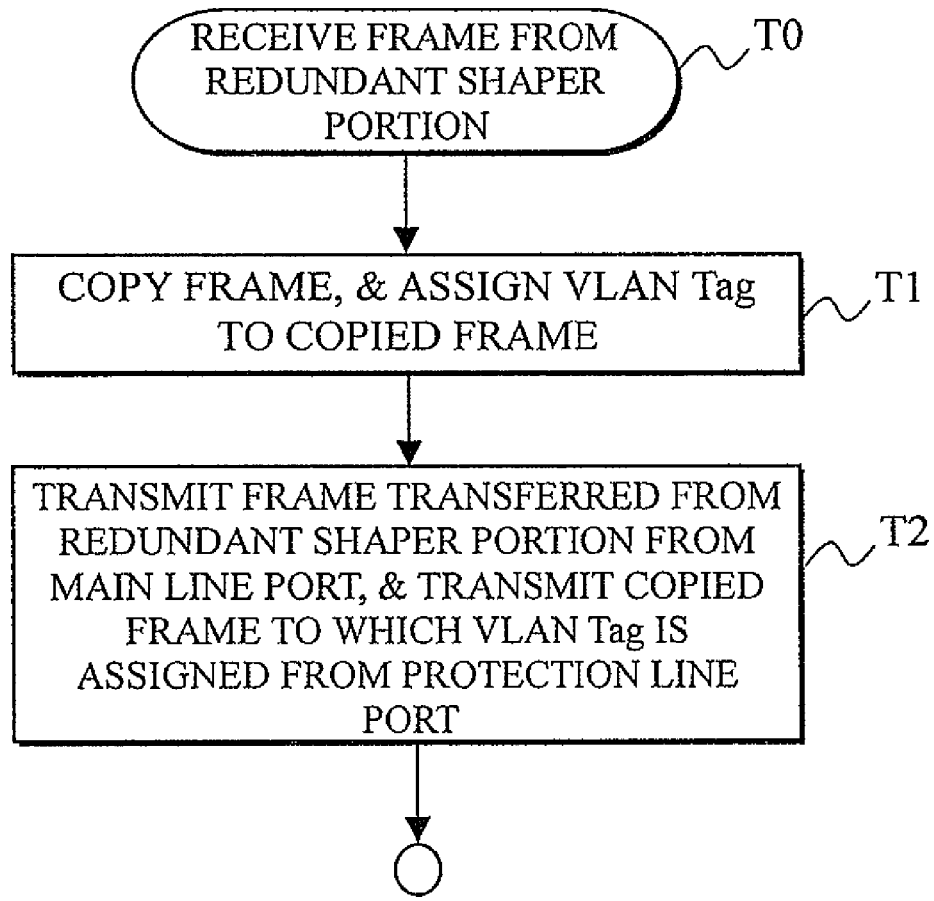
FIG. 9 is a flowchart showing a processing example of a redundant frame transmitter in a data transmission apparatus according to the present invention.
Figure 30:
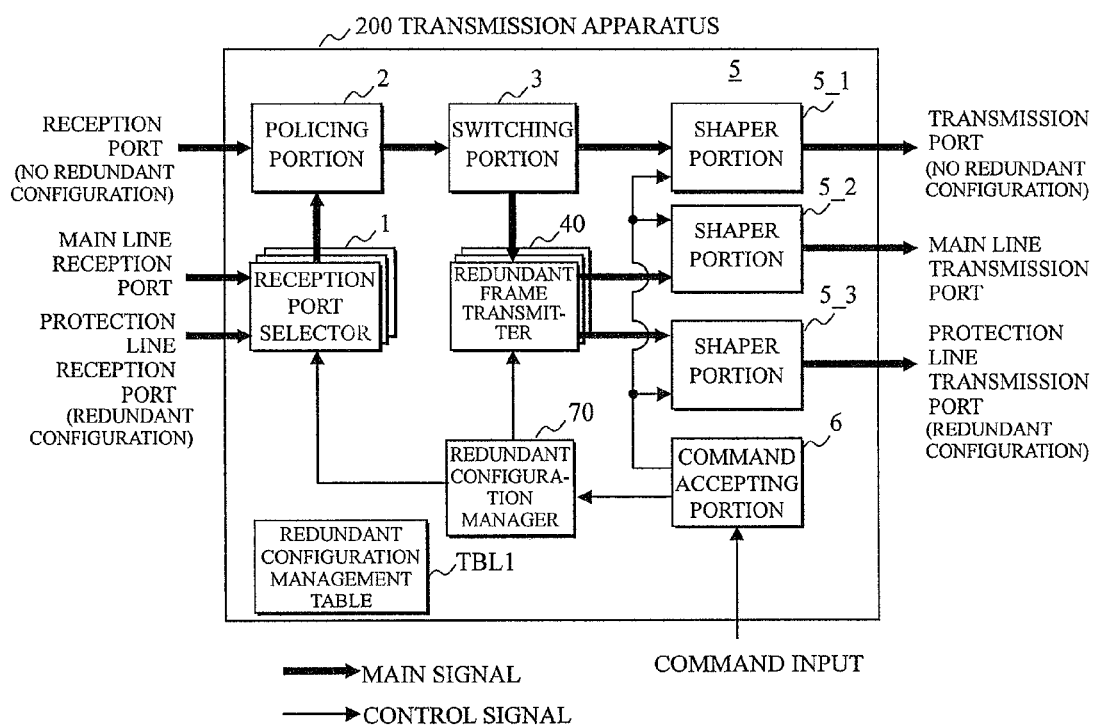
FIG. 30 is a block diagram showing an arrangement of a prior art transmission apparatus (1:1 protection system)
Figure 31:
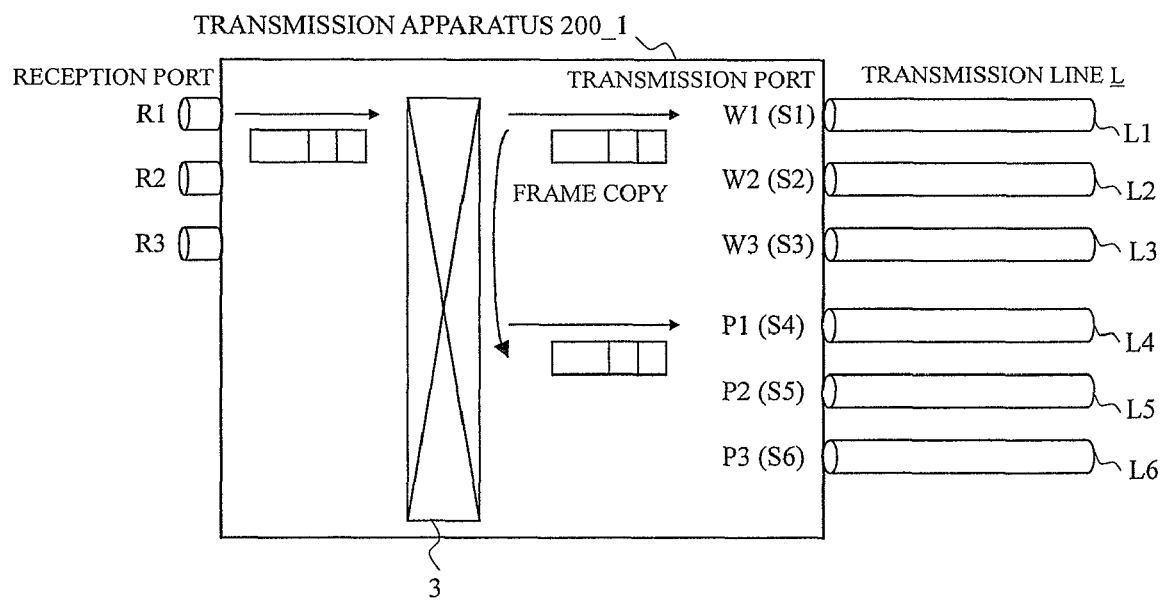
FIG. 31 is a block diagram showing an operation example (1) of a prior art frame transmission.
Figure 32:
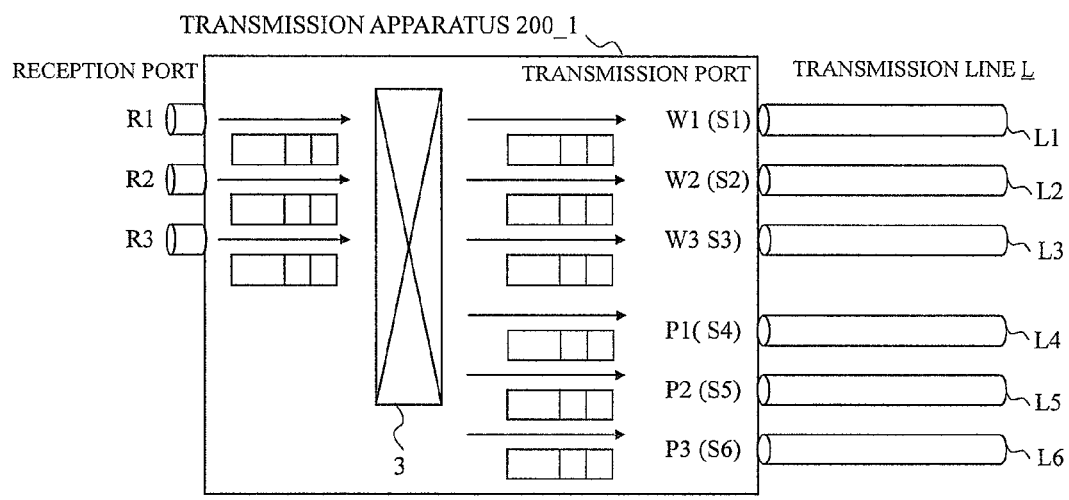
FIG. 32 is a block diagram showing an operation example (2) of a prior art frame transmission.
Figure 33:
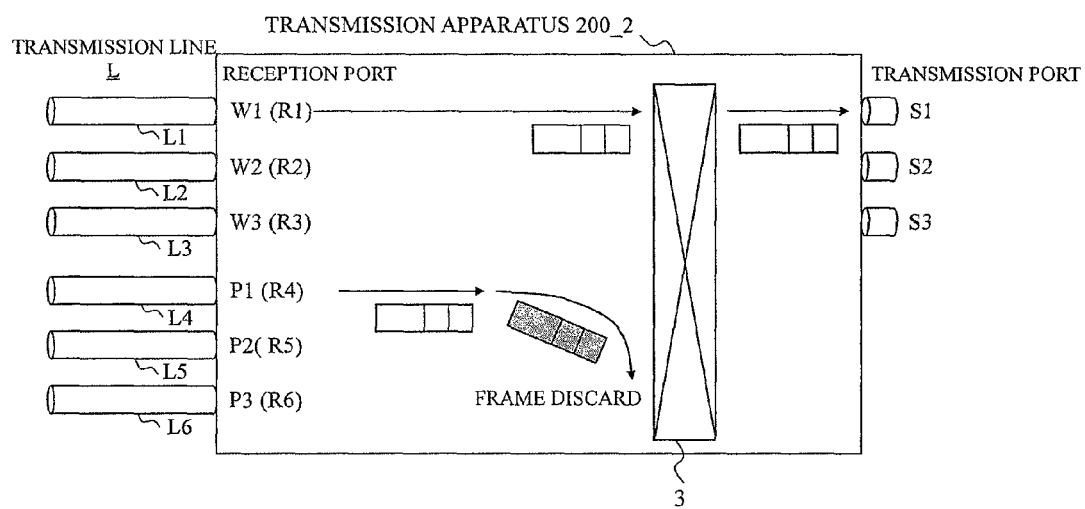
FIG. 33 is a block diagram showing an operation example (1) of a prior art frame reception.
Figure 34:
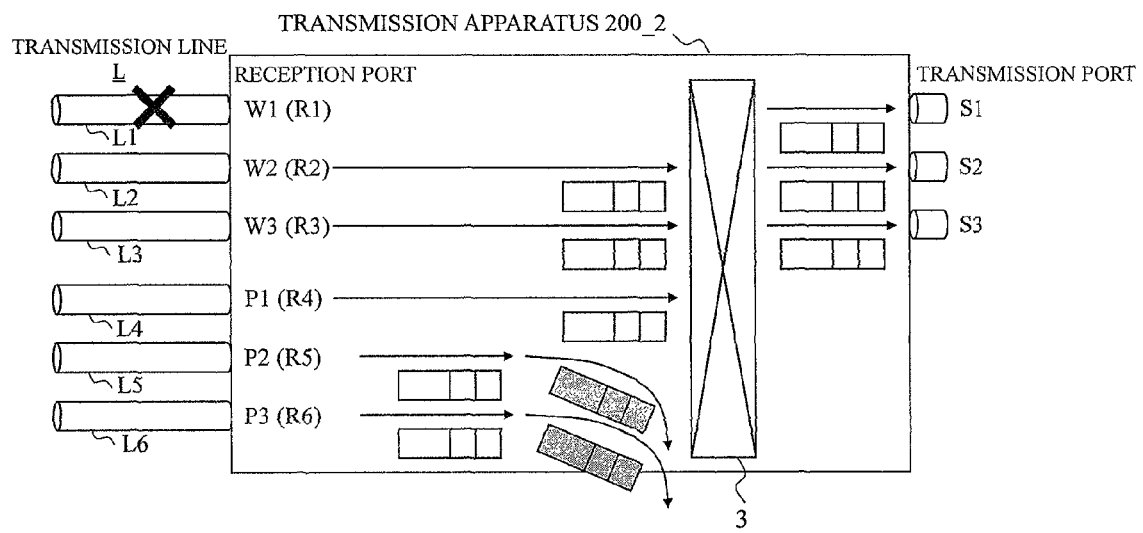
FIG. 34 is a block diagram showing an operation example (2) of a prior art frame reception.
Figure 35:
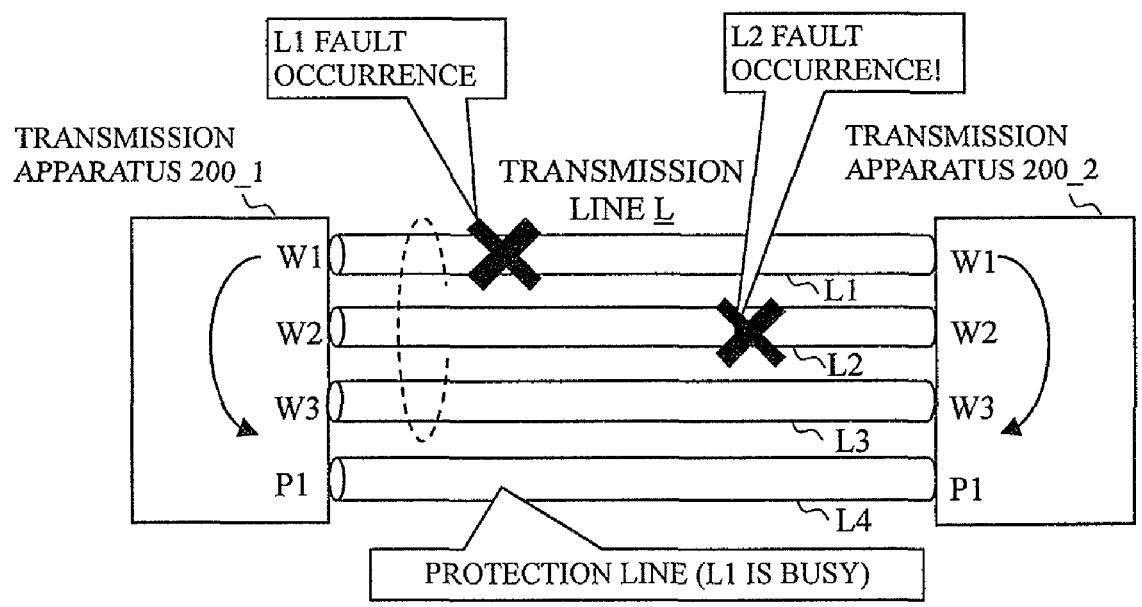
FIG. 35 is a block diagram showing a state of a fault occurrence in a plurality of lines of a prior art N:1 protection system.

FIG. 8 shows an arrangement of an embodiment (1) of the present invention, in which the same reference numerals as those in the prior art arrangement shown in FIG. 30 indicate the same portions. The different portions are as follows:

Redundant Configuration Frame Transmitter 4:

The redundant configuration frame transmitter 4 copies a frame, and transmits the copied frames from the main line port and the protection line port. In the present invention, the frame is copied and identifiers are assigned to the copied frames. The original frame is transmitted from the main line port and the frame to which the identifier is assigned is transmitted from the protection line port. FIG. 9 is a flowchart showing a processing example of the redundant configuration frame transmitter 4, which will be described later.

Figure 10:
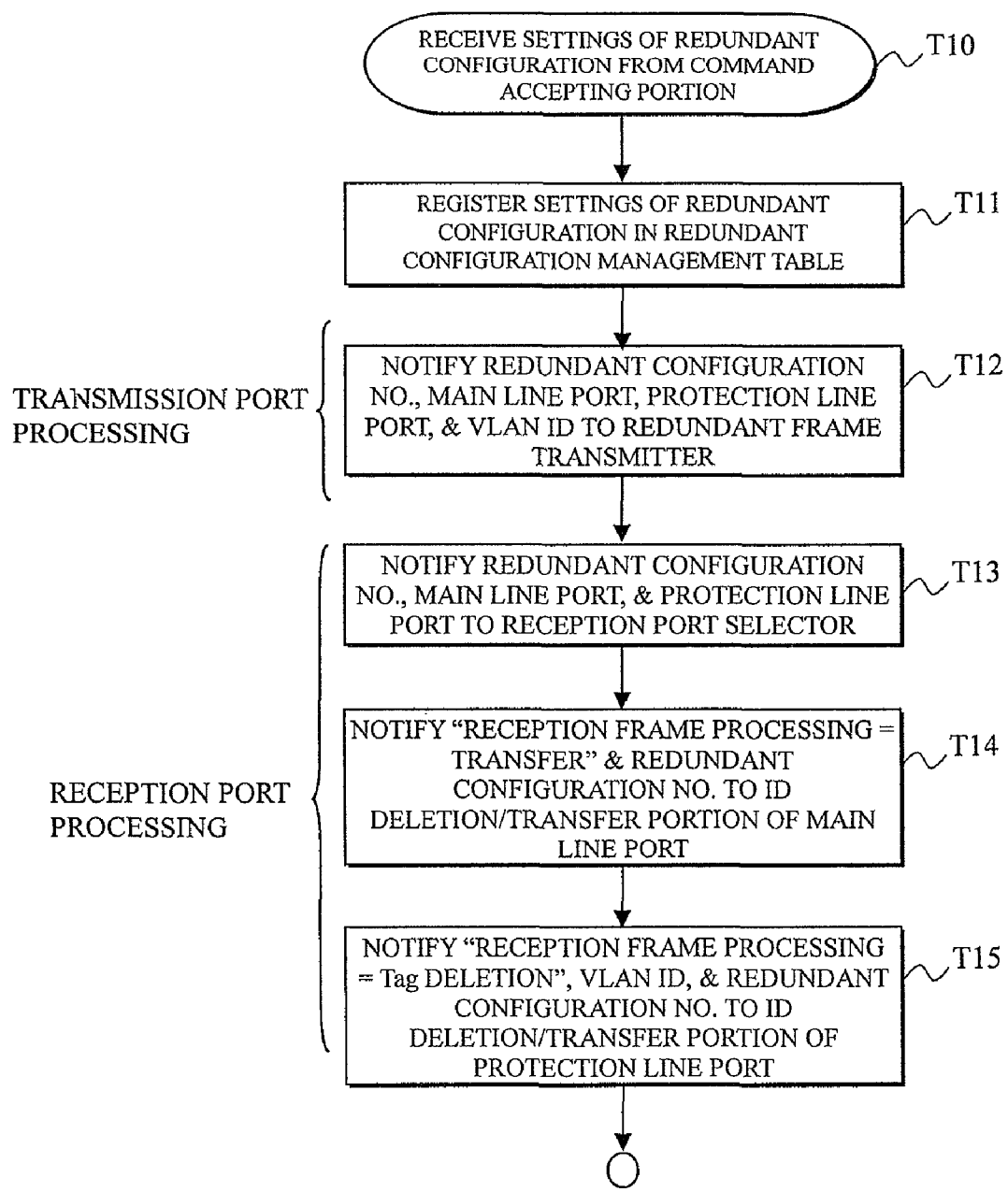
FIG. 10 is a flowchart showing a processing example of a redundant configuration manager in a data transmission apparatus according to the present invention.

Redundant Configuration Manager 7:

The redundant configuration manager 7 manages redundant configuration settings, and notifies redundant configuration settings to the reception port selector 1 and the redundant frame transmitter 4. In the present invention, the redundant configuration manager 7 notifies the redundant configuration contents to the reception port selector 1 and the redundant frame transmitter 4, as well as a processing mode of a received frame, a redundant configuration No., and an identifier to an ID deletion/transfer portion 8. FIG. 10 shows the processing example of the redundant configuration manager 7, which will be described later.

Figure 11:
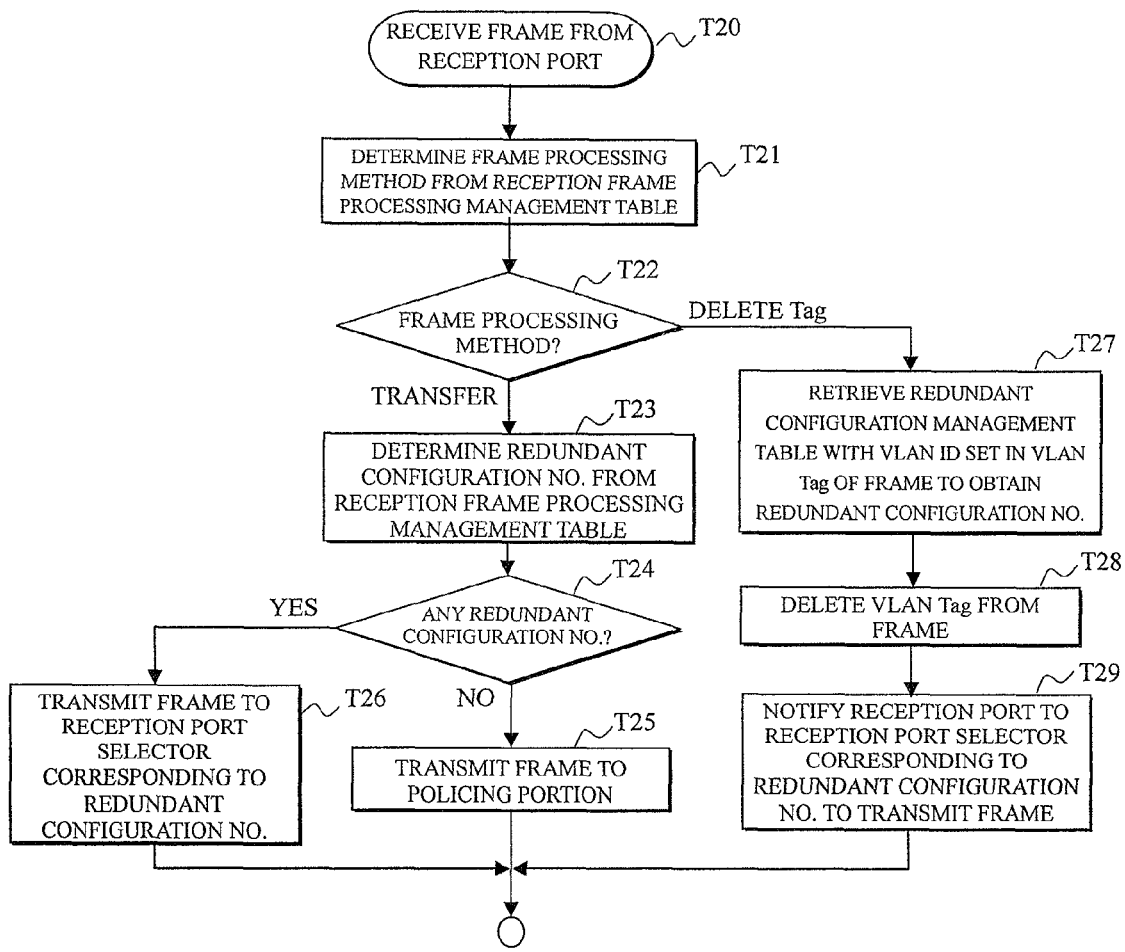
FIG. 11 is a flowchart showing a processing example of an ID deletion/transfer portion in a data transmission apparatus according to the present invention.

ID Deletion/Transfer Portion 8 (8_1-8_3):

When the processing mode of the received frame is "transfer", the ID deletion/transfer portion 8 transfers the frame to each portion. When the processing mode of the received frame is "ID deletion", the ID deletion/transfer portion 8 acquires the redundant configuration No. based on the identifier, and transfers the frame from which the identifier is deleted to the reception port selector 1. FIG. 11 shows the processing example of the ID deletion/transfer portion 8, which will be described later.

Figure 12:
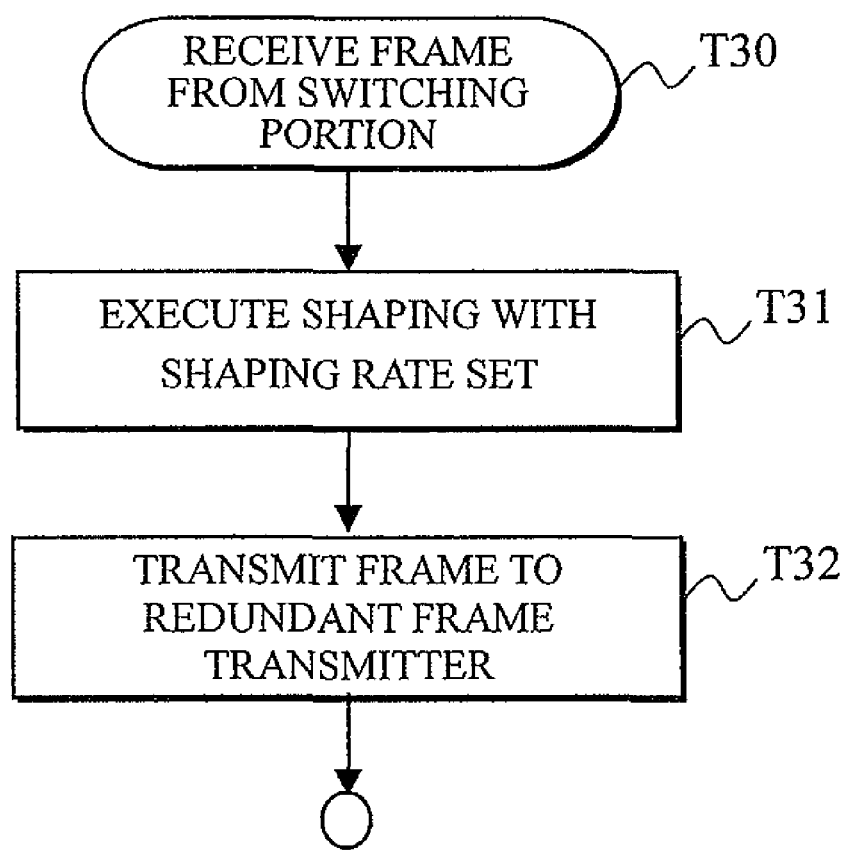
FIG. 12 is a flowchart showing a processing example of a redundant shaper portion in a data transmission apparatus according to the present invention.

Redundant Shaper Portion 9:

The redundant shaper portion 9 performs shaping per redundant configuration, and then transfers the frame to the redundant frame transmitter 4. FIG. 12 shows a processing example of the redundant shaper portion 9, which will be described later.

Also, in this embodiment (1), a received frame processing management table TBL2 is used in addition to the redundant configuration management table TBL1. The redundant configuration management table TBL1 is also used in the prior art example shown in FIG. 30, and is a table which manages a VLAN ID and the redundant configuration No. as shown in FIGS. 13A and 13B. The received frame processing management table TBL2 is, as shown in FIGS. 14A-14E, a table associating the processing mode of the received frame with the redundant configuration No. for the management.

Figure 15:
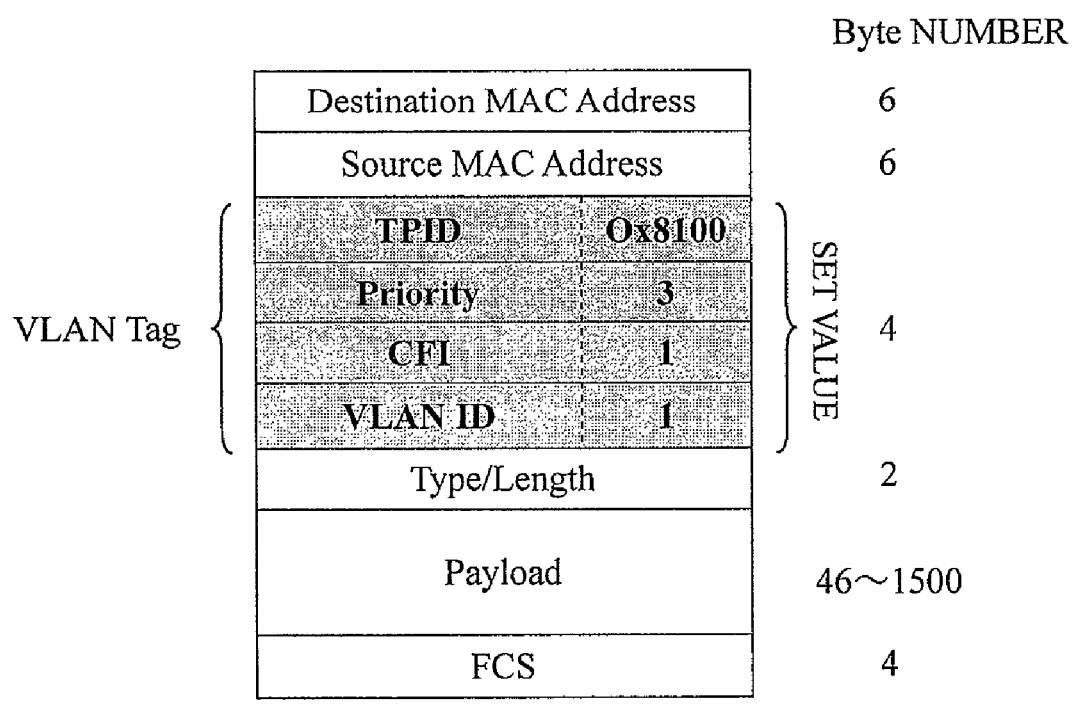
FIG. 15 is a diagram showing a frame format used for a data transmission apparatus according to the present invention.

FIG. 15 shows a format example of a frame used in the present invention. The VLAN Tag in the frame is 4-byte VLAN information, and includes a VLAN ID, priority information, and the like. The VLAN ID is an identifier for identifying the VLAN, and assumes a unique value in a layer 2 network.

Operation Example: FIGS. 16-21

Firstly, a case of selecting a valid line within the main line/protection line on a reception side will be described in this embodiment in order to simplify the description. A case of selecting the valid line on a transmission side can be applied to the present invention without problems. Also, as an identifier assigned to the frame transmitted from the protection line port, "VLAN ID" is used in this embodiment. As one example of this "VLAN ID", the redundant configuration No. is used. However, a case of setting the VLAN ID corresponding to the redundant configuration No. by a command input can be similarly applied.

Figure 16:
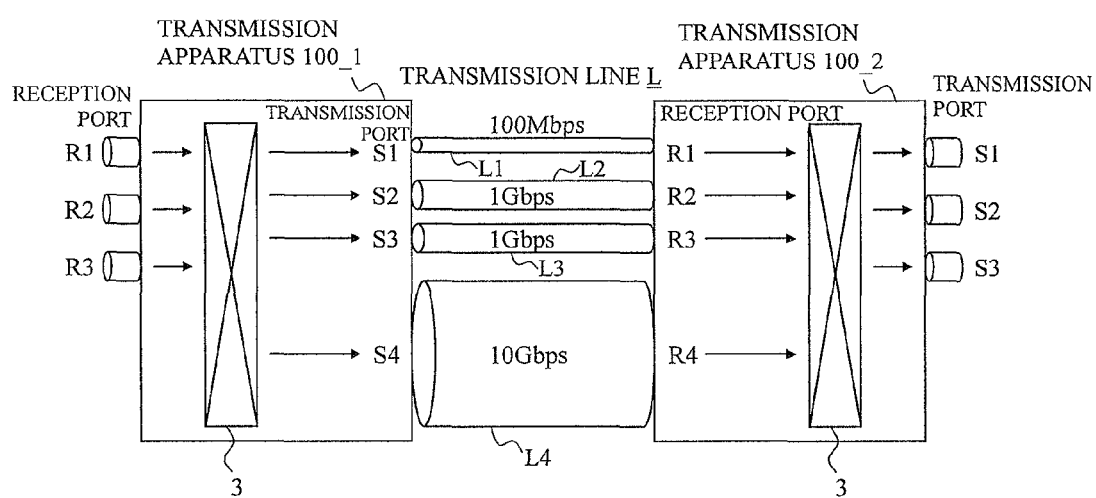
FIG. 16 is a block diagram showing an example of a network configuration by an embodiment (1) of the present invention.

FIG. 16 is an example of a network configuration in this embodiment (1). The transmission apparatus 100_1 has reception ports R1-R3, and transmission ports S1-S4 (main lines L1-L3 and protection line L4). The bandwidths of the transmission ports are, as shown in FIG. 16, S1 (L1): 100 Mbps, S2 (L2): 1 Gbps, S3 (L3): 1 Gbps, S4 (L4): 10 Gbps. Also, the transmission apparatus 100_2 has reception ports R1-R4 and transmission ports S1-S3. The bandwidths of the reception ports are, corresponding to the lines L1-L4, R1: 100 Mbps, R2: 1 Gbps, R3: 1 Gbps, and R4: 10 Gbps.

In this embodiment (1), a case where the redundant configuration is formed in the lines between the transmission apparatuses 100_1 and 100_2 and a frame is transmitted from the transmission apparatus 100_1 to the transmission apparatus 100_2 will now be described.

1) Firstly, an operation of the transmission apparatuses 100_1 and 100_2 up to forming the redundant configuration in the lines between the transmission apparatuses 100_1 and 100_2 shown in FIG. 16 will now be described referring to FIG. 8.

Firstly, in the redundant configuration setting operation of the transmission apparatus 100_1, the command accepting portion 6 accepts a command for forming the redundant configuration 1 with the transmission port S1 being made the main line port W1 and the transmission port S4 being made the protection line port P1, and then notifies the settings to the redundant configuration manager 7 (at step T10 in FIG. 10).

The redundant configuration manager 7 registers, as shown in the flowchart in FIG. 10, the settings in the redundant configuration management table TBL1 (at step T11), and executes the transmission port processing (at step T12) and the reception port processing (at steps T13-T15). Hereinafter, only the transmission port processing will be described in order to simplify the description, and the reception port processing will be described later in the operation of the transmission apparatus 100_2.

As shown in the flowchart in FIG. 10, as for the transmission port, the redundant configuration No.1, the main line port S1, the protection line port S4, and a VLAN ID1 are notified to the redundant frame transmitter 4 (at step T12).

Similarly, the command accepting portion 6 accepts a command for forming the redundant configuration 2 with the transmission port S2 being made the main line port W2 and the transmission port S4 being made the protection line port S2, and the redundant configuration 3 with the transmission port S3 being made the main line port W3 and the transmission port S4 being made the protection line port P3. The operation of this case is the same as the case of forming the redundant configuration 1.

FIG. 13A shows the redundant configuration management table TBL1 of the transmission apparatus 100_1 upon thus forming the redundant configurations 1-3.

It is to be noted that since the reception ports R1-R3 of the transmission apparatus 100_1 are ports which form no redundant configuration, the received frame processing management table TBL2 of the reception ports R1-R3 is initial setting unchanged as shown in FIG. 14A.

Hereinafter, the operation of the transmission apparatus 100_2 will be described. The command accepting portion 6 accepts the command for forming the redundant configuration 1 with the reception port R1 being made the main line port W1 and the reception port R4 as the protection line port P1, and then notifies the settings to the redundant configuration manager 7. The redundant configuration manager 7 of the present invention registers, as shown in the flowchart in FIG. 10, the settings in the redundant configuration management table TBL1 (at step T11), and performs the transmission port processing (at step T12) and the reception port processing (at steps T13-T15). Since the transmission port processing has been described above, only the reception port processing will now be described.

The redundant configuration manager 7 notifies to the reception port selector 1 the redundant configuration No.1, the main line port R1, and the protection line port R4 (at step T13). Also, the redundant configuration manager 7 notifies to the ID deletion/transfer portion 8_2 of the reception port R1 which is the main line port "received frame=transfer" and the redundant configuration No.1 (at step T14), and notifies the ID deletion/transfer portion 8_3 of the reception port R4 which is the protection line port the received frame tag deletion, the VLAN ID1, and the redundant configuration No.1 (at step T15).

Similarly, the redundant configuration 2 is formed with the reception port R2 as the main line port W2 and the reception port R4 as the protection line port P2 and the redundant configuration 3 is formed with the reception port R3 as the main line port W3 and the reception port R4 as the protection line port P3. The operation of this case is the same as the case of forming the redundant configuration 1. FIG. 13B shows the redundant configuration management table TBL1 of the transmission apparatus 100_2 when the redundant configurations 1-3 are formed. Also, FIGS. 14B-14E show the received frame processing management tables TBL2 of the reception ports R1-R4 of the transmission apparatus 100_2.

Figure 17:
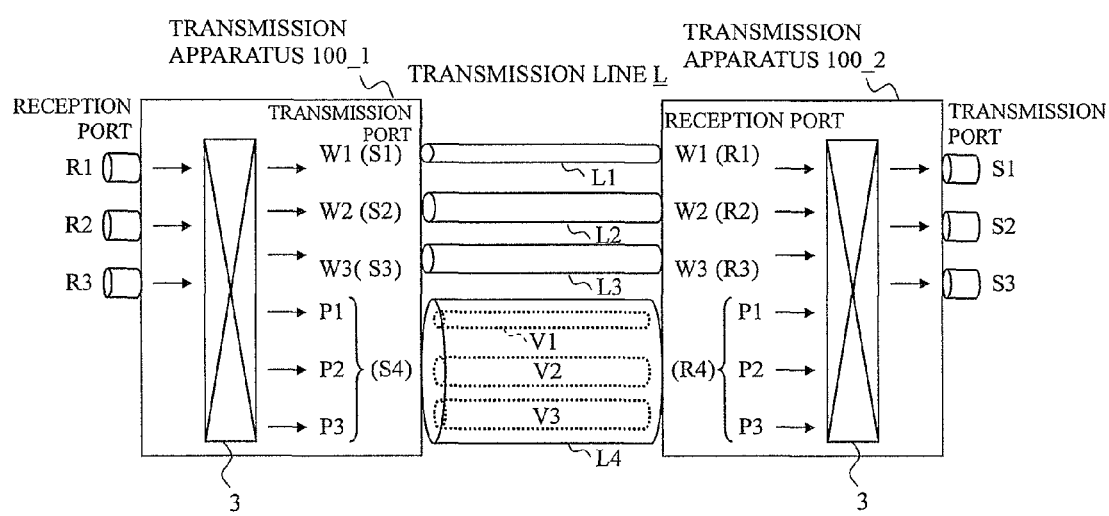
FIG. 17 is a block diagram showing an example of a redundant configuration by an embodiment (1) of the present invention.

FIG. 17 shows a state where the redundant configuration is thus formed in the lines L1-L4 between the transmission apparatuses 100_1 and 100_2.

Figure 18:
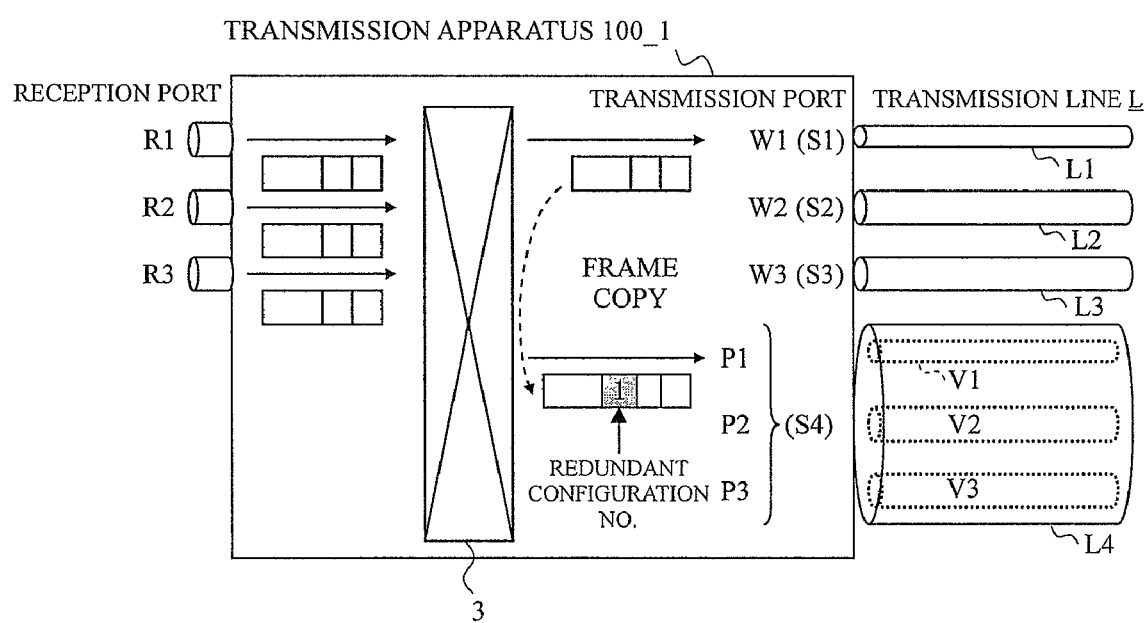
FIG. 18 is a block diagram showing an operation example (1) of a frame transmission by an embodiment (1) of the present invention.

2) Hereinafter, an operation up to transmitting the frame received at the reception ports R1-R3 of the transmission apparatus 100_1 from the main line port W1 (transmission port SI) and the protection line port P1 (transmission port S4) of the redundant configuration 1 will be described as shown in FIG. 18.

The frames received at the reception ports R1-R3 are transferred to the ID deletion/transfer portion 8_2. The ID deletion/transfer portion 8_2 refers, as shown in the flowchart in FIG. 11, to the received frame processing management table TBL2 shown in FIG. 14A (at step T21). As a result, due to "received frame=transfer" and no redundant configuration No., the frames are transferred to the policing portion 2 (at steps T22-T25).

Then, the frames are transferred from the policing portion 2 to the switching portion 3. The switching portion 3 determines the transmission ports based on the destination MAC addresses of the frames. The operations of the policing portion 2 and the switching portion 3 are the same as those of the prior art.

When the transmission port determined by the switching portion 3 is the redundant configuration 1, the frame is transferred to the redundant shaper portion 9. The redundant shaper portion 9 of the redundant configuration 1 having received the frame performs shaping as shown in the flowchart in FIG. 12 (at steps T30 and T31), and transfers the frame to the redundant frame transmitter 4 of the redundant configuration 1 (at step T32). It is to be noted that the operation up to setting the shaping rate in the redundant shaper portion 9 will described later in the embodiment (2).

The redundant frame transmitter 4 of the redundant configuration 1 to which the frame is transferred from the redundant shaper portion 9 copies the frame as shown in the flowchart in FIG. 9, and assigns the VLAN Tag of the VLAN ID1 to the copied frame (at steps T0 and T1). The frame transferred from the redundant shaper portion 9 is transmitted from the main line port W1 (transmission port SI), and the frame to which the VLAN Tag is assigned is transmitted from the protection line port P1 (transmission port S4) as shown in FIG. 18 (at step T2), at which FIG. 15 shows a frame format transmitted from the protection line port P1 (transmission port S4).

Figure 19:
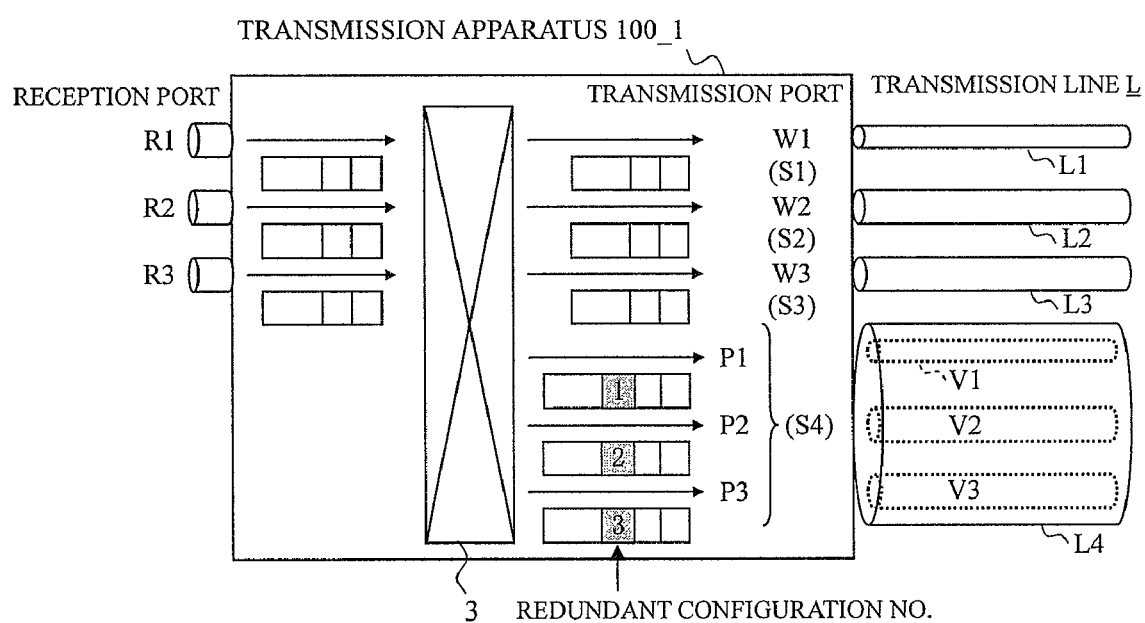
FIG. 19 is a block diagram showing an operation example (2) of a frame transmission by an embodiment (1) of the present invention.

Also, when the transmission ports determined by the switching portion 3 are the redundant configurations 2 and 3, the frames to which the VLAN Tags are assigned are transmitted from the protection line ports P2 and P3 (transmission port S4) as in the case of redundant configuration 1, at which FIG. 19 shows a state where the frames are transmitted by all of the redundant configurations of the transmission apparatus 100_1.

As described above, the VLAN Tag is assigned to the frame, thereby enabling the frames of a plurality of redundant configurations to be transmitted with a single protection line.

Figure 20:
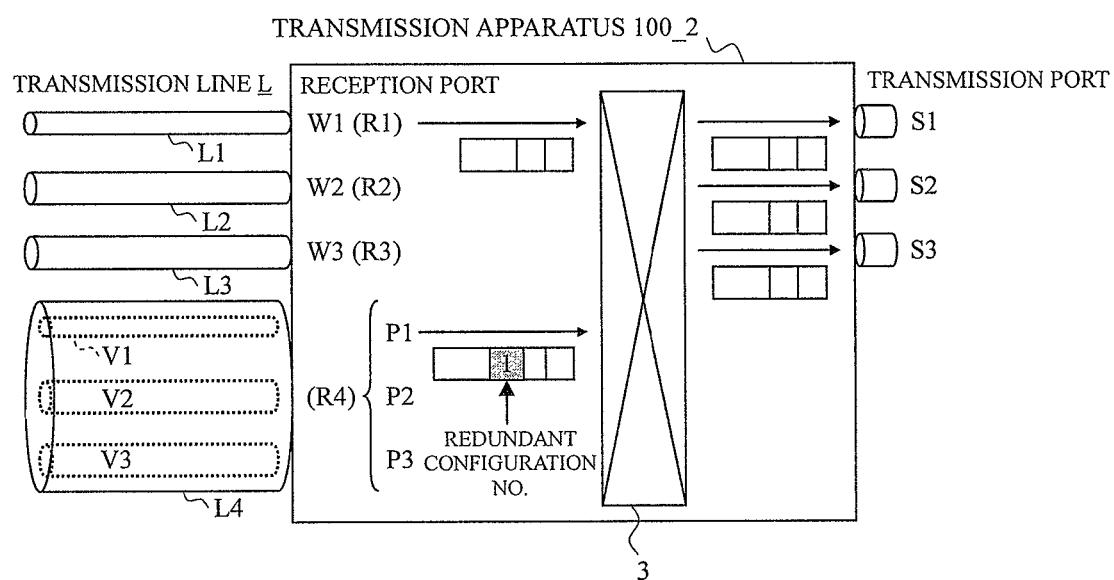
FIG. 20 is a block diagram showing an operation example (1) of a frame reception by an embodiment (1) of the present invention.

3) Hereinafter, an operation up to transmitting the frames received at the main line port W1 (reception port R1) and the protection line port P1 (reception port R4) of the redundant configuration 1 of the transmission apparatus 100_2 from the transmission ports S1-S3 will be described as shown in FIG. 20.

The frame received at the main line port W1 (reception port R1) is transferred to the ID deletion/transfer portion 8_2 of the main line port W1 (reception port R1). This ID deletion/transfer portion 8_2 refers, as shown in a flowchart in FIG. 11, the received frame processing management table TBL2 in FIGS. 14B-14E (at steps T20 and T21). Due to "received frame=transfer" and redundant configuration No.1 (at steps T22-T24), the reception port R1 is notified to the reception port selector 1 corresponding to the redundant configuration 1 to transfer the frame (at step T26).

The reception port selector 1 of the redundant configuration 1 to which the frame is transferred from the ID deletion/transfer portion 8_2 determines that the reception port R1 is a current valid port of the redundant configuration 1 without a fault occurrence since the reception port notified is "R1", and transfers the frame to the policing portion 2. Then, the frame is transferred from the policing portion 2 to the switching portion 3, and the switching portion 3 determines the transmission port based on the destination MAC address of the frame, so that the frame is transferred to the redundant shaper portion 9 corresponding to the transmission port.

The redundant shaper portion 9 performs, as shown in FIG. 12, shaping at a shaping rate set (at steps T30 and T31), and transfers the frame to the redundant frame transmitter 4 (at step T32). The redundant frame transmitter 4 transmits the frame from the main line port W1 (transmission port S1).

On the other hand, the frame received at the protection line port P1 (reception port R4) of the transmission apparatus 100_2 is transferred to the ID deletion/transfer portion 8_3 of the protection line port P1 (reception port R4). This ID deletion/transfer portion 8_3 refers, as shown in a flowchart in FIG. 11, the received frame processing management table TBL2 in FIG. 14E (at steps T20 and T21).

Due to the result of "the received frame Tag deletion" (at step T22), the redundant configuration management table TBL1 in FIG. 13B is retrieved based on the VLAN ID1 of the VLAN Tag to acquire the redundant configuration No.1 (at step T27). Furthermore, the VLAN Tag is deleted from the frame (at step T28), the reception port R4 is notified to the reception port selector 1 corresponding to the redundant configuration No.1 acquired, and the frame is transferred (at step T29).

The reception port selector 1 of the redundant configuration 1 to which the frame is transferred from the ID deletion/transfer portion 8_3 determines that the port R4 is not a current valid port of the redundant configuration 1 since the notified port is R4, so that the frame is discarded.

Thus, even if the VLAN Tag is assigned to the frame received at the protection line port, the frame is normally discarded.

Figure 21:
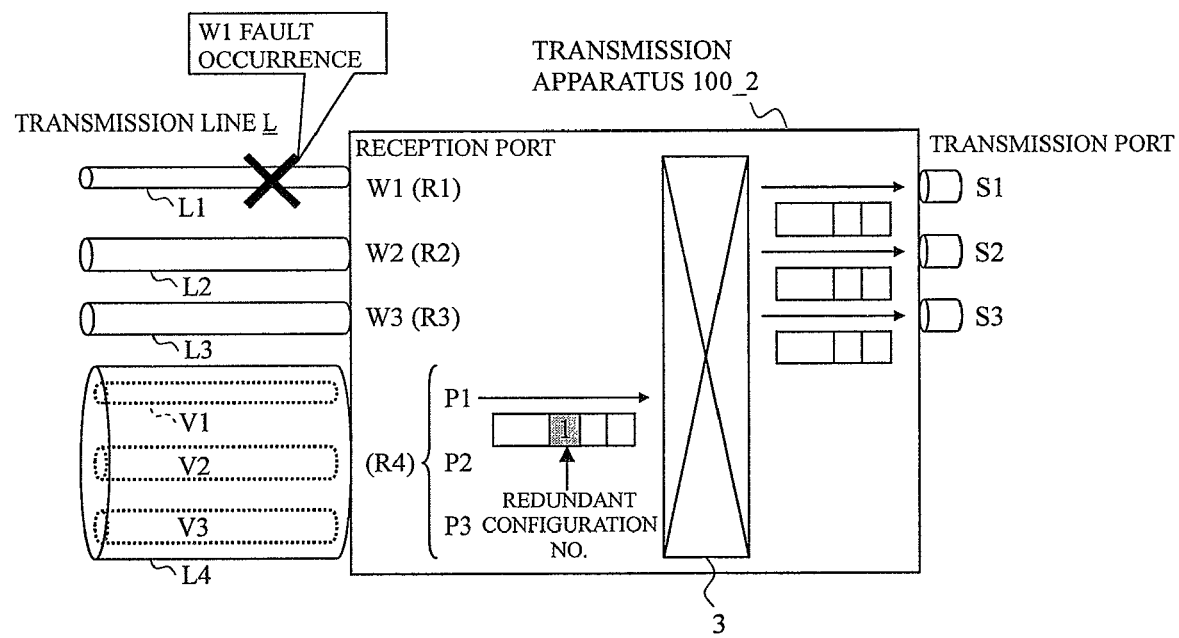
FIG. 21 is a block diagram showing an operation example (2) of a frame reception by an embodiment (1) of the present invention.

4) Hereinafter, operation up to transmitting the frame received at the protection line port P1 (reception port R4) from the transmission ports 1-3 when a fault has occurred at e.g. the main line port W1 (reception port R1) of the redundant configuration 1 of the transmission apparatus 100_2 as shown in FIG. 21 will be described.

The reception port selector 1 of the redundant configuration 1 to which the frame having deleted therefrom the VLAN Tag is transferred from the ID deletion/transfer portion 8_3 of the protection line port P1 (reception port R4) recognizes that the reception port R1 during the fault occurrence is an invalid port. Accordingly, it is determined that the notified reception port R4 is the current valid port of the redundant configuration 1, so that the transferred frame is further transferred to the policing portion 2.

Then, the frame is transferred from the policing portion 2 to the switching portion 3, which determines the transmission port based on the destination MAC address of the frame, so that the frame is transferred to the redundant shaper portion 9 of the transmission port. The redundant shaper portion 9 performs, as shown in FIG. 12, shaping (at steps T30 and T31), and transmits the frame to the redundant frame transmitter 4 (at step T32), so that the redundant frame transmitter 4 transmits the frame from the main line port W1 (transmission port S1).

Thus, even if the VLAN Tag is assigned to the frame received at the protection line port upon fault occurrence, it is normally determined that the frame is valid, so that the reception processing is performed.

Also in the cases of the protection line port P2 of the redundant configuration 2 and the protection line port P3 (reception port R4 in both cases) of the redundant configuration 3, the redundant configuration No. is acquired based on the VLAN ID of the VLAN Tag, and the frame from which the VLAN Tag is deleted is transferred to the reception port selector 1 of the redundant configuration, as in the case of the redundant configuration 1.

As described above, the redundant configuration No. is acquired based on the VLAN ID of the VLAN Tag assigned to the frame, and the VLAN Tag is deleted, thereby enabling frames of a plurality of redundant configurations to be received with a single protection line.

Thus, a plurality of virtual 1:1 protections can be formed with a plurality of main lines and a single protection line.

Embodiment (2): FIGS. 22-24, 25A-25C, 26 and 27

Figure 22:
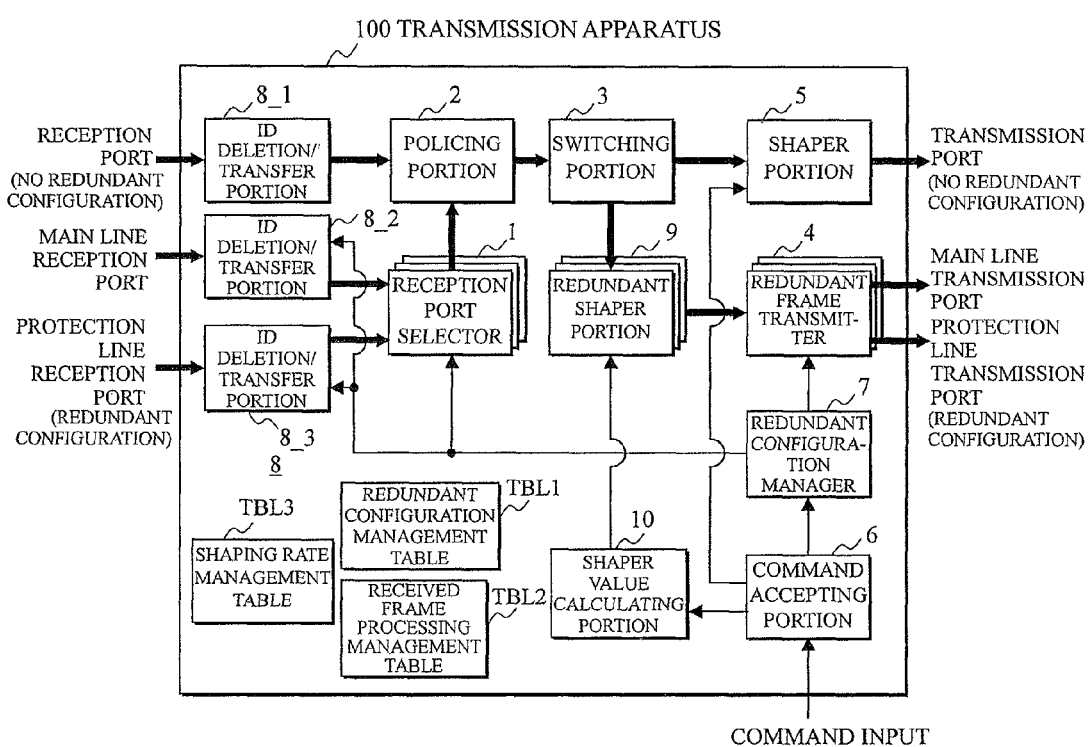
FIG. 22 is a block diagram showing an embodiment (2) of a data transmission apparatus according to the present invention.

FIG. 22 shows an arrangement of this embodiment (2) of the present invention. In FIG. 22, the same reference numerals as those in the embodiment (1) shown in FIG. 8 indicate the same portion. However, this embodiment (2) is different from the embodiment (1) in that a shaper value calculating portion 10 and a shaping rate management table TBL3 are added.

Figure 23:
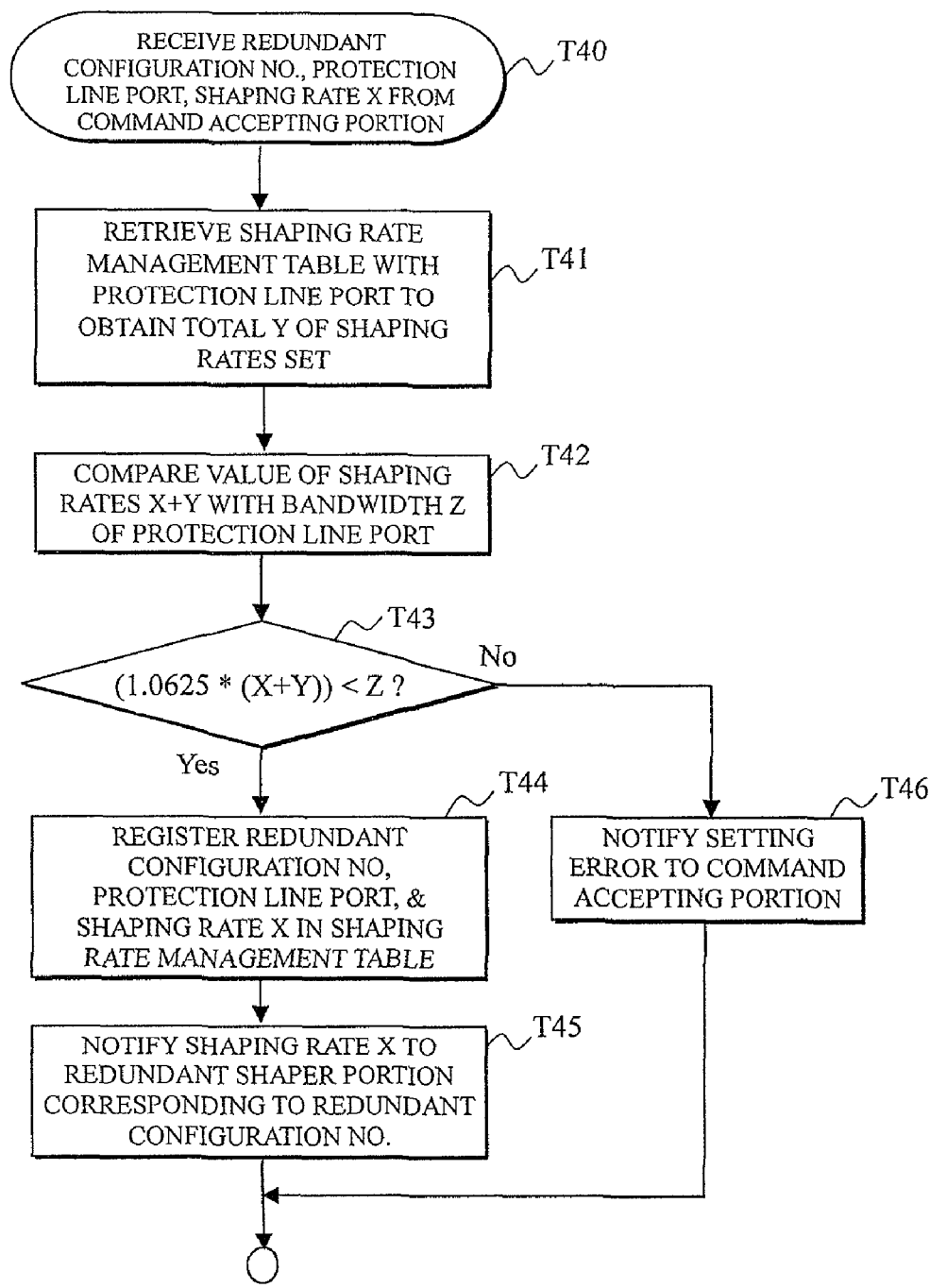
FIG. 23 is a flowchart showing a processing example (1) (upon redundant configuration setting) of a shaper value calculating portion used for an embodiment (2) of the present invention.
Figure 24:
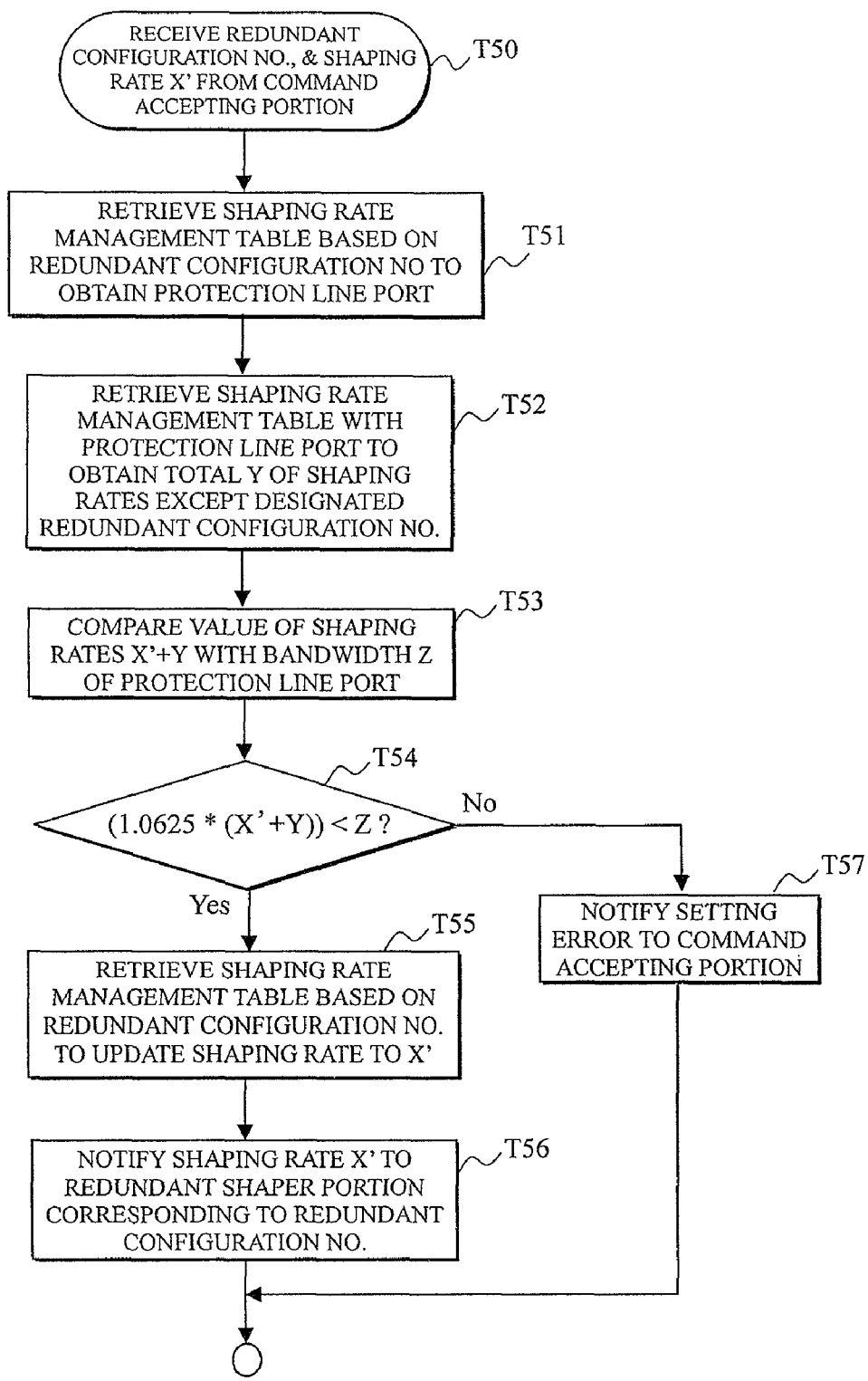
FIG. 24 is a flowchart showing a processing example (2) (upon redundant configuration change) of a shaper value calculating portion used for an embodiment (2) of the present invention.

The shaper value calculating portion 10 manages the shaping rates of all of the redundant configurations within the transmission apparatus 100, and notifies the shaping rate to the redundant shaper portion 9 of each redundant configuration. FIGS. 23 and 24 respectively show the processing flow examples (1) (upon redundant configuration setting) and (2) (upon shaping rate change), which will be described later.

Also, the shaping rate management table TBL3 is a table for managing shaping rate information of all of the redundant configurations within the transmission apparatus 100. FIGS. 25A-25C show the embodiment of the table. This will be also described later.

Figure 26:
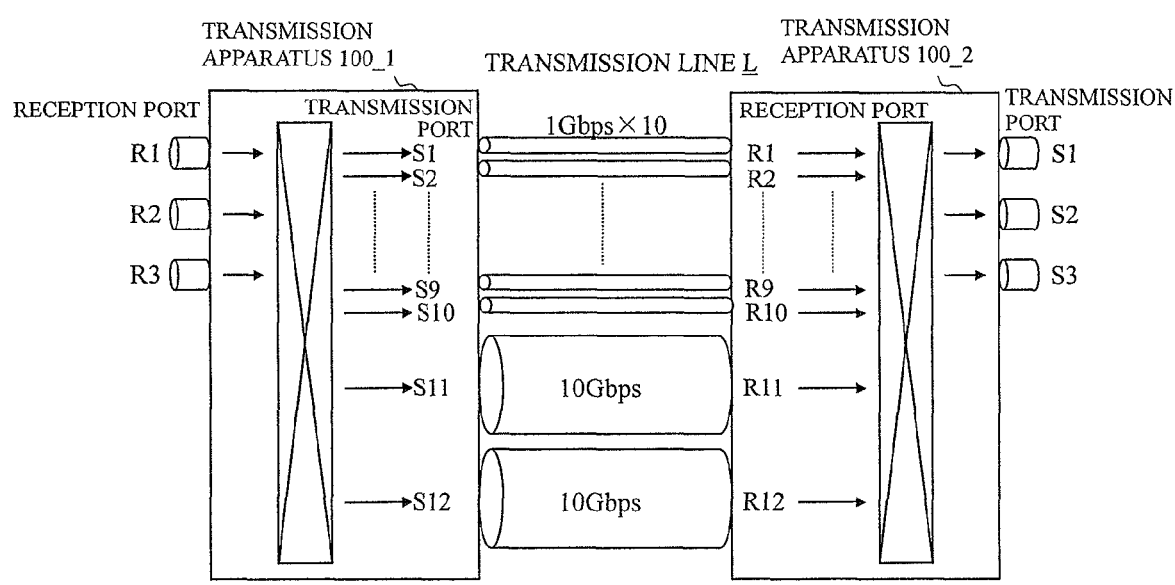
FIG. 26 is a block diagram showing an example of a network configuration used for an embodiment (2) of the present invention.

FIG. 26 is an example of a network configuration applied to this embodiment (2). The transmission apparatus 100_1 has reception ports R1-R3 and transmission ports S1-S12. The bandwidths of the transmission ports are S1-S10: 1 Gbps, S11 and S12: 10 Gbps. The transmission apparatus 100_2 has reception ports R1-R12 and transmission ports S1-3. The bandwidths of the reception ports are R1-R10: 1 Gbps, R11 and R12: 10 Gbps. Also, the initial value of the shaping rate forming the redundant configuration is the bandwidth of the main line port.

Figure 27:
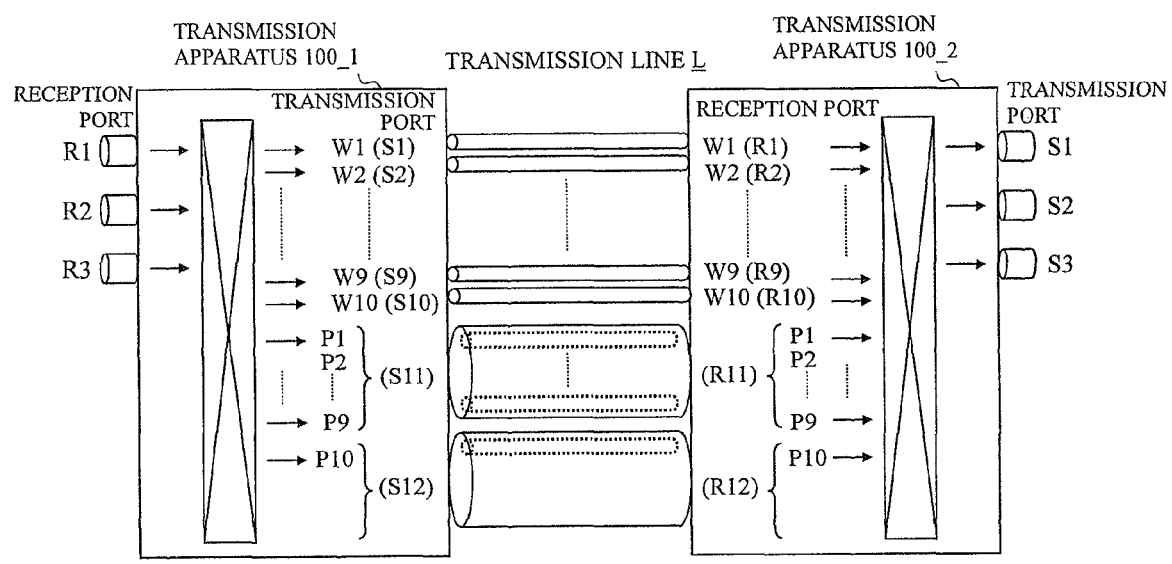
FIG. 27 is a block diagram showing an example (1) redundant configuration setting of an embodiment (2) of the present invention.
Figure 28:
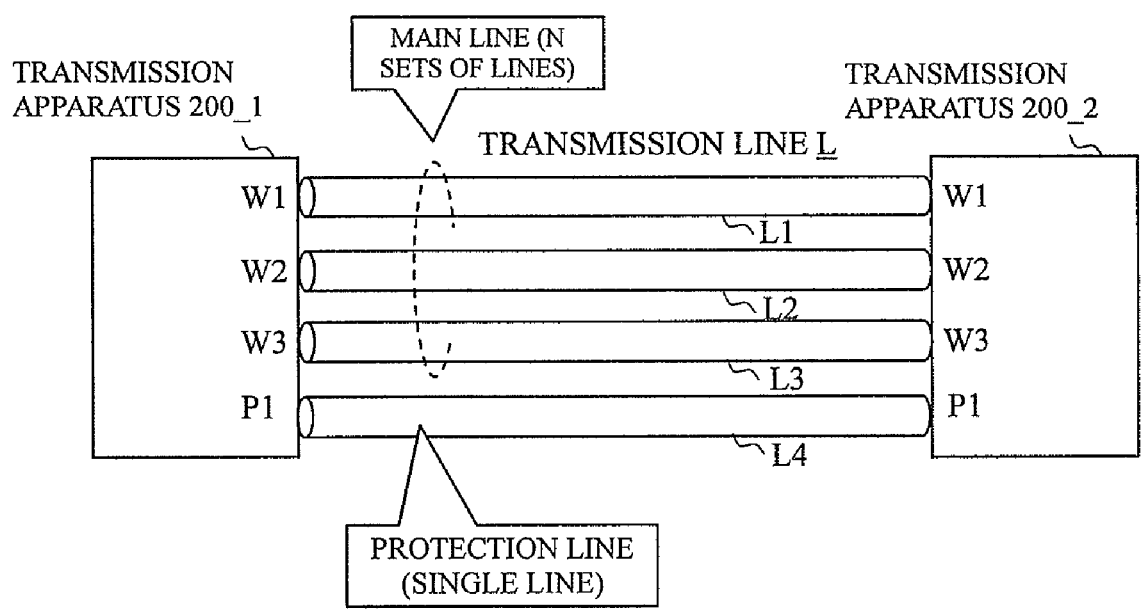
FIG. 28 is a block diagram showing a prior art example (1) (N:1 protection system)
Figure 29:
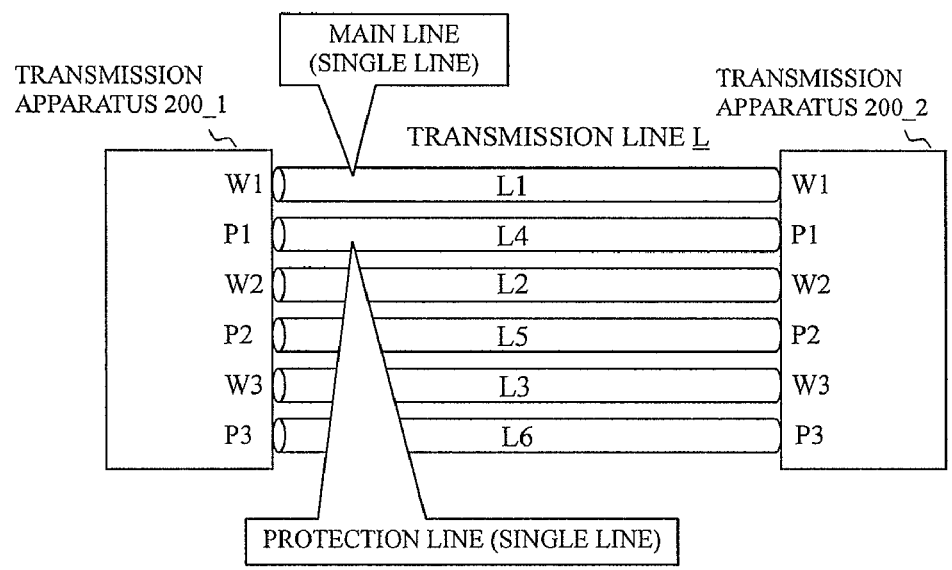
FIG. 29 is a block diagram showing a prior art example (2) (1:1 protection system)

1) Firstly, an operation of the transmission apparatus 100_2 up to forming redundant configurations 1-10 in the transmission line L between the transmission apparatuses 100_1 and 100_2 shown in FIG. 27 will be described.

Firstly, the operation of forming the redundant configuration 1 will be described. The command accepting portion 6 having received a command of forming the redundant configuration 1 with the transmission port S1 being made the main line port W1 and the transmission port S11 being made the protection line port P1 notifies, as shown in the processing flow example (1) (upon redundant configuration setting) of FIG. 23, the redundant configuration No.1, the protection line transmission port S11, and a shaping rate X=1 Gbps to the shaper value calculating portion 10 (at step T40). The shaper value calculating portion 10 to which the settings have been notified retrieves the shaping rate management table TBL3 at the protection line transmission port S11. However, since there is not yet another redundant configuration using the same protection line port (at step T41: Y=0), the shaping rates X+Y=1 Gbps of the redundant configuration 1 are compared with the bandwidth Z of the protection line port S11=10 Gbps (at step T42).

In order to provide a QoS guarantee in the protection line transmission port S11 equivalent to the main line port W1 at this moment, it is required to consider the VLAN Tag as an identifier assigned when the frame is transmitted from the protection line transmission port S11. As shown in the frame format in FIG. 15, the minimum values of the frame sizes before and after assigning the VLAN Tag are respectively 64 bytes and 68 bytes, so that the increase rate of the frame sizes is 6.25% (68/64=1.0625).

Namely, in order to transmit a frame to which the VLAN Tag is assigned from the protection line transmission port S11 while a frame of 1 Gbps is transmitted from the main line port W1, the bandwidth of 1 Gbps*1.0625=1.0625 Gbps is required. Accordingly, when the shaping rate is compared with the bandwidth of the protection line port, it is required to compare the value of shaping rate*1.0625 with the bandwidth of the protection line port (at step T43).

Accordingly, the comparison between the shaping rate and the bandwidth of the protection line port assumes 1 Gbps*1.0625=1.0625 Gbps<10 Gbps is acquired, which can guarantee the QoS. Therefore, the redundant configuration No.1, the protection line port P1 (S11), and the shaping rate X=1 Gbps are registered in the shaping rate management table TBL3 (at step T44). The shaping rate X=1 Gbps is notified to the redundant shaper portion 9 corresponding to the redundant configuration 1 (at step T45), at which FIG. 25A shows the shaping rate managing table TBL3.

Hereinafter, the operation of forming the redundant configuration 2 will be described. The command accepting portion 6 having received the command for forming the redundant configuration 2 with the transmission port S2 as the main line port W2 and the transmission port S11 as the protection line port P2 notifies the redundant configuration No.2, the protection line port P2 (transmission port S11), and the shaping rate X=1 Gbps to the shaper value calculating portion 10. The shaper value calculating portion 10 to which the settings have been notified retrieves the shaping rate management table TBL3 at the protection line transmission port S11 (at steps T40 and T41) as shown in the flowchart in FIG. 23, and compares the total value X+Y of a shaping rate Y=1 Gbps of the redundant configuration 1 mentioned above and the shaping rate X=1 Gbps of the redundant configuration 2 using the same protection line transmission port S11 with a bandwidth Z of the protection line transmission port S11=10 Gbps (at steps T42 and T43).

It results in that "(1 Gbps+1 Gbps)*1.0625=2.125 Gbps"<"10 Gbps", which can guarantee the QoS. Therefore, as shown in FIG. 25B, the redundant configuration No.2, the protection line transmission port S11, and the shaping rate X=1 Gbps are registered in the shaping rate management table TBL3 (at step T44). The shaping rate X is notified to the redundant shaper portion 9 of the redundant configuration 2 (at step T45).

The operations of forming the redundant configurations 3-9 are performed as in the case of the redundant configuration 2 (see FIG. 25B).

Hereinafter, the operation of the transmission apparatus 100_1 in the case of adding the redundant configuration 10 will be described. The command accepting portion 6 having received the command for forming the redundant configuration 10 with the transmission port S10 as the main line port W10 and the transmission port S11 as the protection line port P10 notifies the redundant configuration No.10, the protection line port P10 (transmission port S11), and the shaping rate X=1 Gbps to the shaper value calculating portion 10 as shown in FIG. 23 (at step T40).

The shaper value calculating portion 10 to which the settings have been notified retrieves the shaping rate management table TBL3 at the protection line transmission port S11, and compares the total value X+Y of the sum Y of shaping rates=9 Gbps of the redundant configurations 1-9 and the shaping rate X=1 Gbps of the redundant configuration 10 using the same protection line port with the bandwidth Z of the protection line transmission port S11=10 Gbps (at steps T41-T43).

It results in that "(9 Gbps+1 Gbps)*1.0625=10.625 Gbps">"10 Gbps", so that a setting error is notified to the command accepting portion 6 (at step T46).

Thus, when the transmission port S11 is made the protection line port, the redundant configuration can not be formed. Therefore, the transmission port is changed to the port S12 to form the redundant configuration 10. This operation is the same as the case of the redundant configuration 1 except the protection line port, at which FIG. 25B shows the shaping rate management table.

Thus, when the total value of the shaping rates of the redundant configurations which set the same transmission port to the protection line port exceeds the bandwidth of a certain protection line port, it is possible to prevent the redundant configuration setting from being made.

2) Hereinafter, an operation of the transmission apparatus 100_1 in the case of changing the shaping rate of the redundant configuration 1 will be described.

The command accepting portion 6 having accepted a command for changing a shaping rate X' of the redundant configuration 1 to 500 Mbps notifies, as shown in the flowchart in FIG. 24, the redundant configuration No.1 and the shaping rate X'=500 Mbps to the shaper value calculating portion 10 (at step T50). The shaper value calculating portion 10 to which the settings are notified retrieves the shaping rate management table TBL3 at the redundant configuration No.1 to acquire the protection line port S11 (at step T51). The shaper value calculating portion 10 retrieves the shaping rate management table TBL3 at the protection line transmission port S11, and compares the total value X'+Y of the sum Y of the shaping rates except the redundant configuration 1, 8 Gbps and the shaping rate X' after the change of the redundant configuration 1, 500 Mbps with the protection line port S11 bandwidth Z=10 Gbps (at steps T52-T54).

It results in that "(8 Gbps+500 Mbps)* 1.0625=9.03125 Gbps"<"10 Gbps", so that the shaping rate management table TBL3 is retrieved based on the redundant configuration No.1, and the shaping rate X' is updated to 500 Mbps (at step T55). Also, the shaping rate X' is notified to the redundant shaper portion 9 of the redundant configuration 1 (at step T56). FIG. 25C shows the shaping rate management table at this time. In the case of "(8 Gbps+500 Mbps)* 1.0625=9.03125 Gbps">"10 Gbps" at step T54, an error notification is performed to the command accepting portion 6 (at step T57).

As mentioned above, when the total value of the shaping rates of the redundant configurations where the same transmission port is set as the protection line port even after the redundant configuration having been formed does not exceed the bandwidth of the protection line port, the shaping rate can be changed.

Thus, it becomes possible to accept the redundant configuration setting and the shaping rate setting so that the total value of the shaping rates of the redundant configurations where the same transmission port is set as the protection line port does not exceed the bandwidth of the protection line port. Also, even when the frame to which the VLAN Tag is assigned is transmitted from the protection line, the QoS guarantee equivalent to that of the main line where the VLAN Tag is not assigned to the frame can be provided.

It is to be noted that the present invention is not limited by the above-mentioned embodiments, and it is obvious that various modifications may be made by one skilled in the art based on the recitation of the claims.

What is claimed is:

1. A data transmission method comprising:
    a first step of setting, as redundant configurations, combinations of a plurality of main line ports with virtual paths established so as to include at least a part of bandwidth data of the main line ports in one or more protection line ports; and
    a second step of copying frames received in the main line ports and assigning identifier data of the redundant configurations to the copied frames to be transmitted through the virtual paths combined with the main line ports in the redundant configurations, wherein
    the second step includes a third step of accepting redundant configuration setting including shaping rates in order that a total value of the shaping rates of the main line ports in redundant configurations using a same protection line port does not exceed bandwidth data of the same protection line port, and a fourth step of performing data shaping per redundant configuration according to the shaping rates accepted.

2. The data transmission method as claimed in claim 1, wherein the third step includes a step of performing the redundant configuration setting for another protection line when the total value exceeds the bandwidth of the same protection line.

3. The data transmission method as claimed in claim 1, wherein the identifiers comprise VLAN-IDs in VLAN Tags provided in the frames.

4. A data transmission apparatus comprising:
    a first means setting, as redundant configurations, combinations of a plurality of main lines with virtual paths established so as to include at least a part of a bandwidth of the main lines in one or more protection lines; and
    a second means copying frames received in the main lines and assigning identifiers of the redundant configurations to the copied frames to be transmitted through the virtual paths combined with the main lines in the redundant configurations, wherein
    the second means includes a third means accepting redundant configuration setting including shaping rates in order that a total value of the shaping rates of main lines in redundant configurations using a same protection line does not exceed a bandwidth of the same protection line, and a fourth means performing shaping per redundant configuration according to the shaping rates accepted.

5. The data transmission apparatus as claimed in claim 4, wherein the third means includes a means performing the redundant configuration setting for another protection line when the total value exceeds the bandwidth of the same protection line.

6. The data transmission apparatus as claimed in claim 4, wherein the identifiers comprise VLAN-IDs in VLAN Tags provided in the frames.

* * * * *